Figure 1:
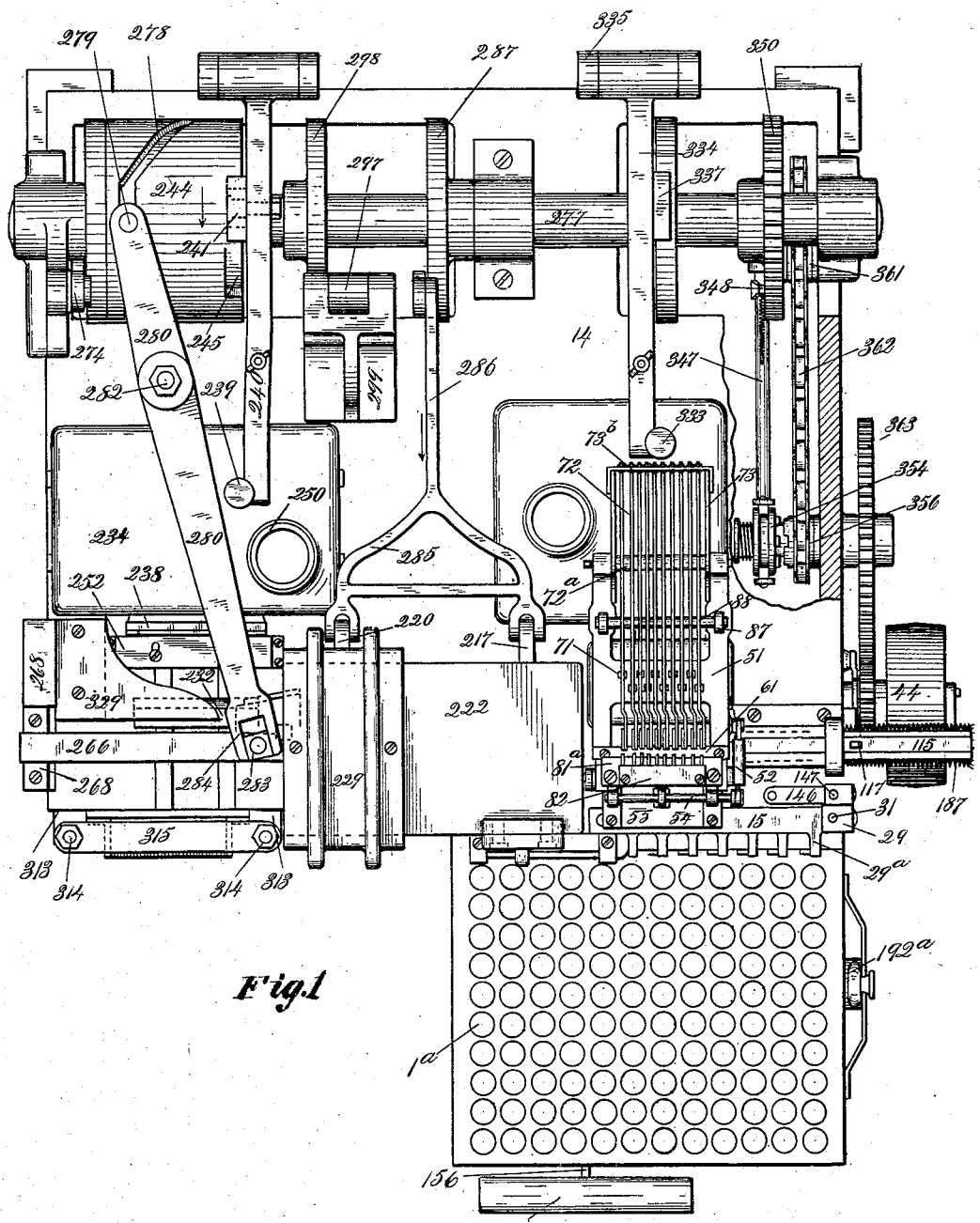

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 1.

Witnesses
Inventor

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 2.

Witnesses
W. S. Guest
L. F. Burch.

Inventor,
A. W. Hanigan
by Chas H Riches
his attorney.

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 3.

Witnesses
Inventor

No. 896,908. PATENTED AUG. 25, 1908.
A. W. HANIGAN.
TYPE CASTING MACHINE.
APPLICATION FILED MAY 5, 1902. RENEWED JUNE 23, 1908.
24 SHEETS—SHEET 4.

Witnesses
Inventor

No. 896,908. PATENTED AUG. 25, 1908.
A. W. HANIGAN.
TYPE CASTING MACHINE.
APPLICATION FILED MAY 5, 1902. RENEWED JUNE 23, 1908.
24 SHEETS—SHEET 5.

Witnesses  Inventor

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 7.

Witnesses
Inventor

No. 896,908. PATENTED AUG. 25, 1908.
A. W. HANIGAN.
TYPE CASTING MACHINE.
APPLICATION FILED MAY 5, 1902. RENEWED JUNE 23, 1908.
24 SHEETS—SHEET 8.

Witnesses
Inventor

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 9.

Witnesses
H. S. Guest
L. F. Burch.

Inventor
A. W. Hanigan
by Chas N. Riches
his attorney

THE NORRIS PETERS CO., WASHINGTON, D. C.

No. 896,908. PATENTED AUG. 25, 1908.
A. W. HANIGAN.
TYPE CASTING MACHINE.
APPLICATION FILED MAY 5, 1902. RENEWED JUNE 23, 1908.
24 SHEETS—SHEET 10.
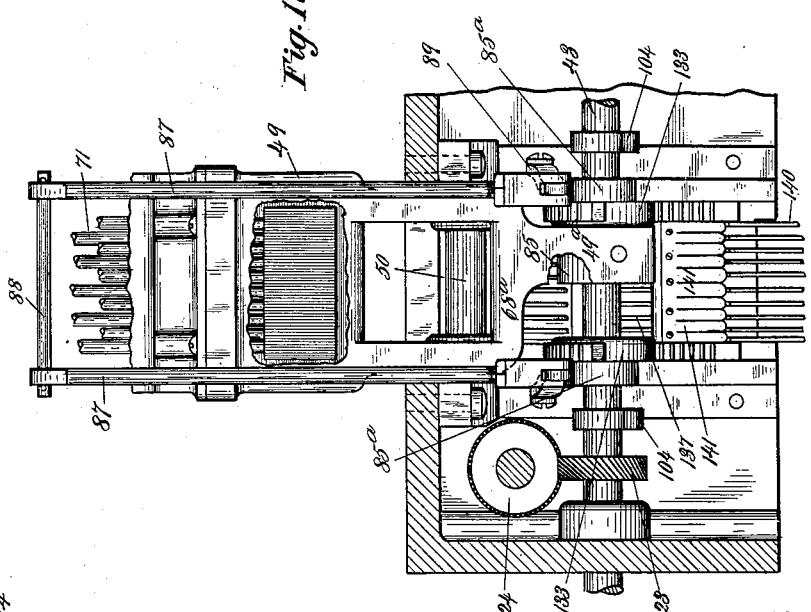
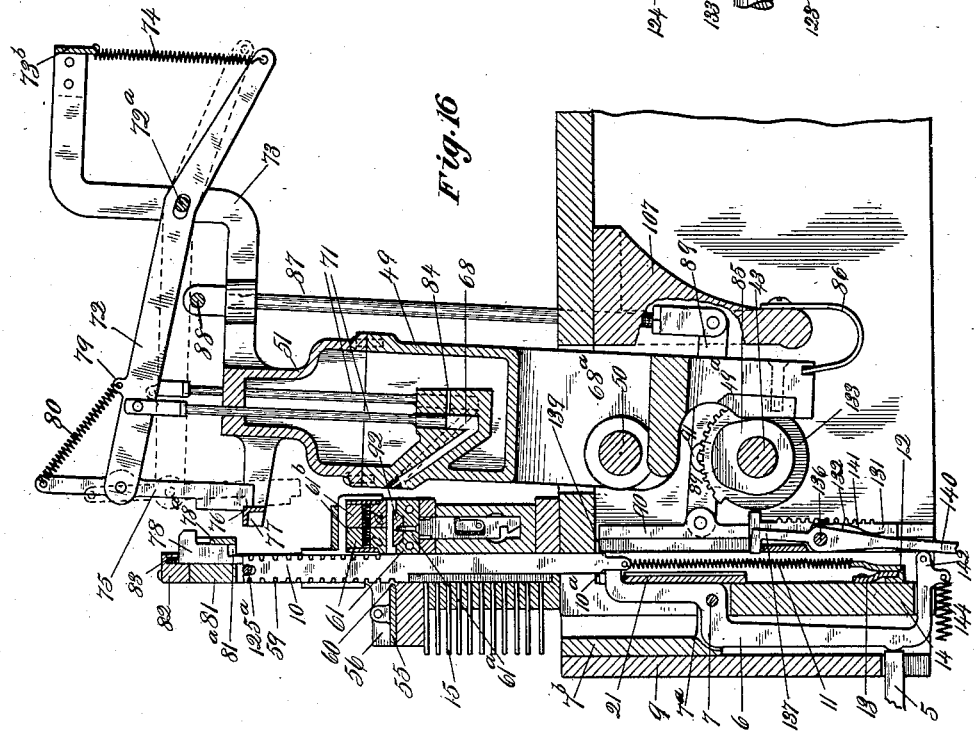
Witnesses
Inventor

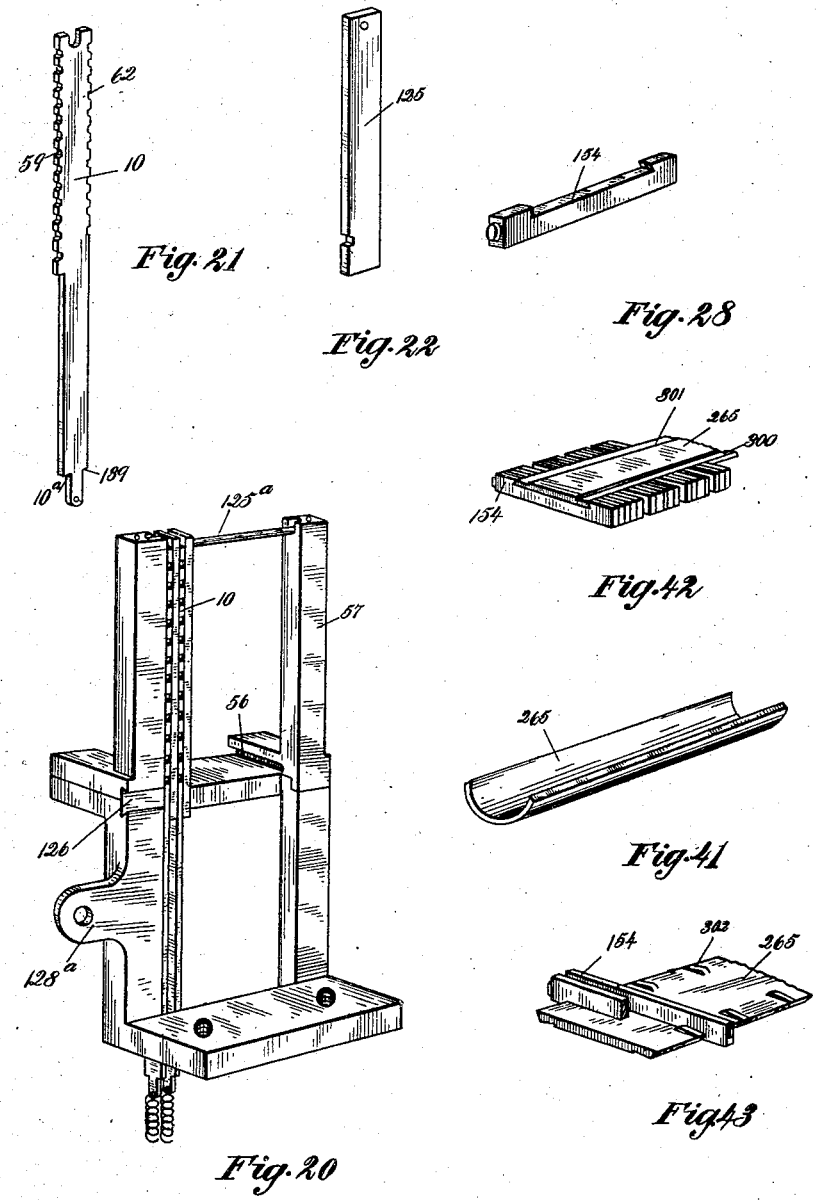

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 12.

Witnesses
W. S. Guest
L. F. Burch

Inventor
A. W. Hanigan
by Chas H Riches
his attorney

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 13.

Witnesses
W S Guest
L F Broch

Inventor
A. W. Hanigan
by Chas H Riches
his attorney

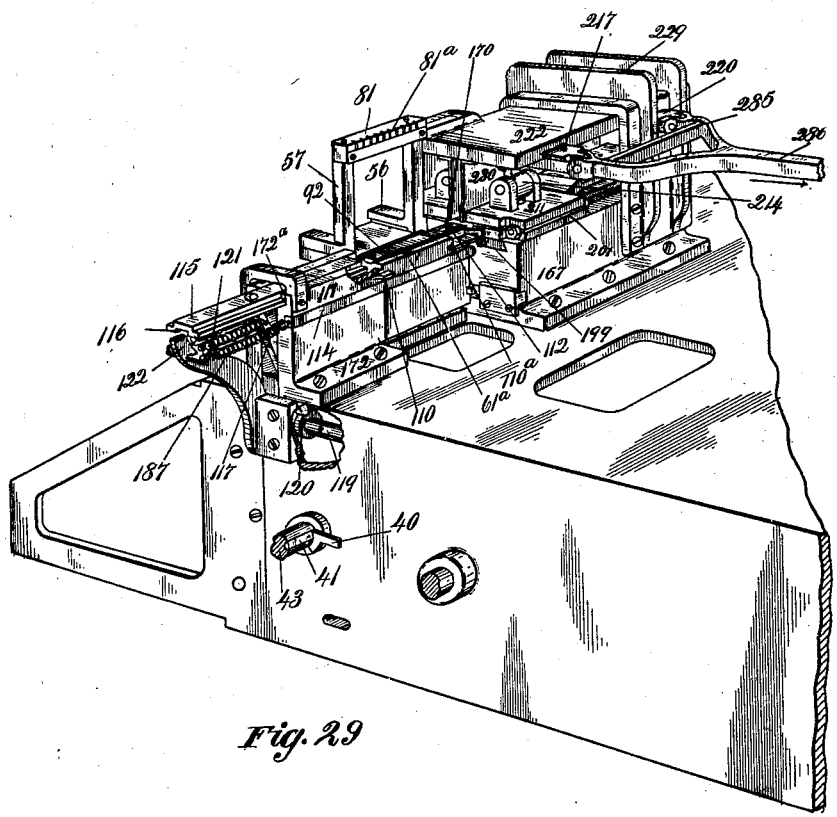

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 15.

Witnesses
Inventor

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 16.

Witnesses
Inventor,

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 17.

Witnesses
Inventor

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 18.

Witnesses
Inventor

No. 896,908. PATENTED AUG. 25, 1908.
A. W. HANIGAN.
TYPE CASTING MACHINE.
APPLICATION FILED MAY 5, 1902. RENEWED JUNE 23, 1908.
24 SHEETS—SHEET 19.
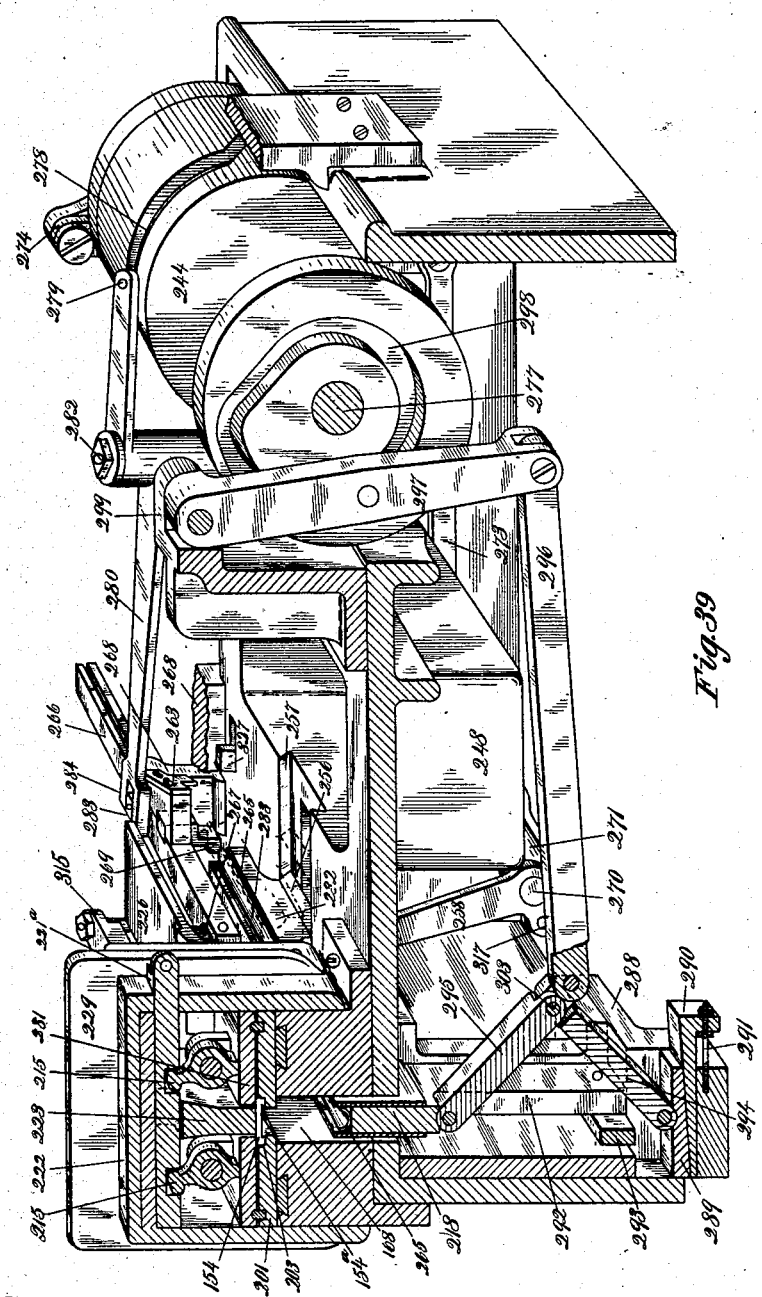
Witnesses
Inventor No. 896,908. PATENTED AUG. 25, 1908.
A. W. HANIGAN.
TYPE CASTING MACHINE.
APPLICATION FILED MAY 5, 1902. RENEWED JUNE 23, 1908.
24 SHEETS—SHEET 20.
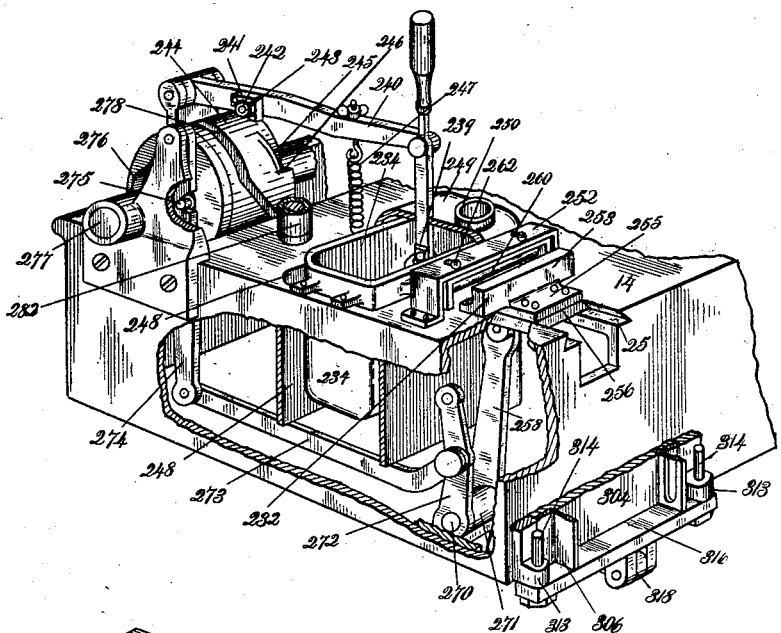
Fig.44
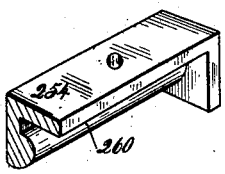
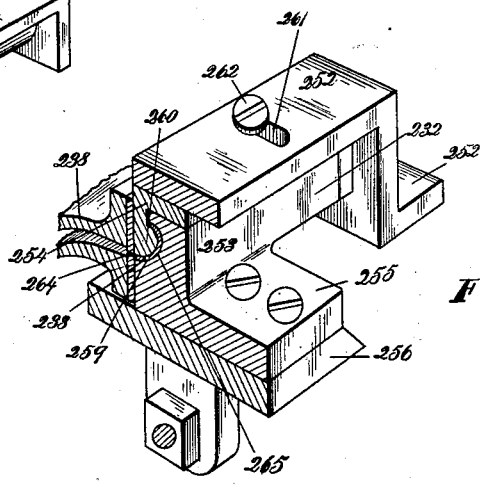
Fig.45
Fig.46
Witnesses
Inventor No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 21.

Witnesses    Inventor

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 22.

Witnesses
Inventor

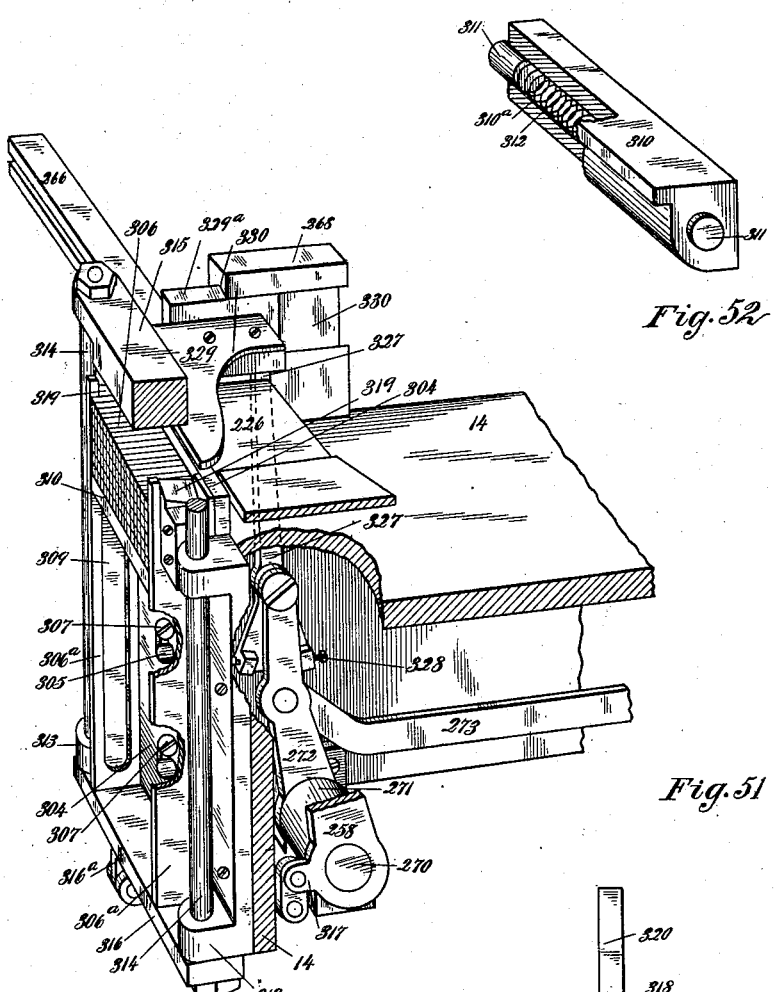

No. 896,908. PATENTED AUG. 25, 1908.
A. W. HANIGAN.
TYPE CASTING MACHINE.
APPLICATION FILED MAY 5, 1902. RENEWED JUNE 23, 1908.

24 SHEETS—SHEET 24.

Witnesses    Inventor

UNITED STATES PATENT

ADAM W. HANIGAN, OF BALTIMORE, MARYLAND, ASSIGNOR TO THE O.
COMPANY LIMITED, OF TORONTO, ONTARIO, CANADA, A CORPORA

TYPE-CASTING MACHINE.

No. 896,908.  Specification of Letters Patent.  Patent

Application filed May 5, 1902, Serial No. 105,920. Renewed June 23, 1908. Serial No. 440,0ὅ.

*To all whom it may concern:*

Be it known that I, ADAM WINFIELD HANIGAN, a citizen of the United States, and resident of Baltimore, in the State of Maryland, temporarily residing at Toronto, in the county of York and Province of Ontario, Canada, have invented certain new and useful Improvements in Type-Casting Machines, of which the following is a full, clear, and exact description.

In my application for Letters Patent, Serial Number 310964, I have shown and described a new class of printers' type, which is produced in individual and sequential order and assembled into properly composed words and word-spaced phrases, lines and sentences. Intermediate the ends of the type are grooves of a substantially dove tail shape to receive a justifying and locking strip, which, when impressed into the grooves, locks the types in their composed and word-spaced condition. The justifying and locking strip, before being impressed into the grooves, is of a substantially semi-circular shape, the distance between its opposite edges being less than the width of the grooves to permit of it being readily pressed therein and then flattened out to completely fill the same and lie evenly against the type.

The present invention relates to a machine for the production of the type described in the above application, the object of the invention being to so arrange the machine that it will produce the type in individual and sequential order, assemble it as it is produced into properly word-spaced lines of any selected length, justify the lines, impress the justifying and locking strip into the grooves and into the word spaces of the justified line and then assemble the locked lines of type in a galley in the order of production.

In carrying out the invention I employ a machine having a series of matrix bars, each movable in a fixed path to and from the casting point, arranged to be released by the operation of key rods bearing appropriate characters, corresponding to the characters of the matrix bar, and positioned by stopping plates, actuated by the operation of the key rods, co-incident with the release of the matrix bars, a high speed mechanism set in motion by the operation of the key board to release a matrix bar, matrix bar alining and locking slides, actuated by the high speed mechanism to respectively aline the character to be reproduced with the mold cavity of the mold, and lock the matrix bars and spacing plates against lateral displacement. When the character to be reproduced has been positioned and alined, the type metal pot, co-incident with the alining of the character, is actuated by the high speed mechanism to pour into the mold cavity sufficient metal to cast the type, the dove tail core therein forming a dove tail groove intermediate the ends of the type.

The formation of the dove tail groove in the type necessitates the mold being constructed in sections separable vertically and laterally to allow of the ejection of the type therefrom by the type ejecting mechanism, which delivers it to the line assembling carriage. During the assemblage of the type on the line assembling carriage, word-spacers are inserted in the assembling line by the action of a word spacer key. When the line assembling carriage has been filled, a hand lever is operated to actuate the justifying mechanism to force the word spacers into the line to expand it to its full and selective extent. When the line has been justified the motion of the hand lever is reversed, to actuate the justifying mechanism to withdraw the word spacers from the justified line so that the line assembling carriage can restore them to the word spacer box as it returns to its normal position. The continued movement of the hand lever in the reverse direction sets in motion a low speed mechanism which causes the line carriage to seize the justified line and rigidly hold it in its justified condition while carrying it from the place of assembly to the place where the justifying and locking strip is impressed into the alined grooves of the type and word spacers of the justified line. When the justifying and locking strip has been impressed into the alined grooves of the type, the line carriage is unlocked and the justified and locked line is ejected from the line carriage and received on a line carrying plate connected to and moving in conjunction with the line carriage. The line carriage after delivering the justified and locked line returns to its normal position to receive the line then in process of assemblage. Co-incident with the pressing in of the justifying and locking strip, the lead strip casting mechanism is actuated to produce a justifying and locking strip for the line in the process of assemblage, and co-inthe line carriage to
justifying and locking
en cast is ejected from
t delivered to the ham-
ato the line of type in
jlage on the line assem-
e succeeding movement
causes the type carrying
previously ejected line to
place immediately in rear of the galley,
where it is pushed by the line ejector plate
from the line carrying plate to the trimming
knives and forced past the trimming knives
into the galley.

Figure 2:
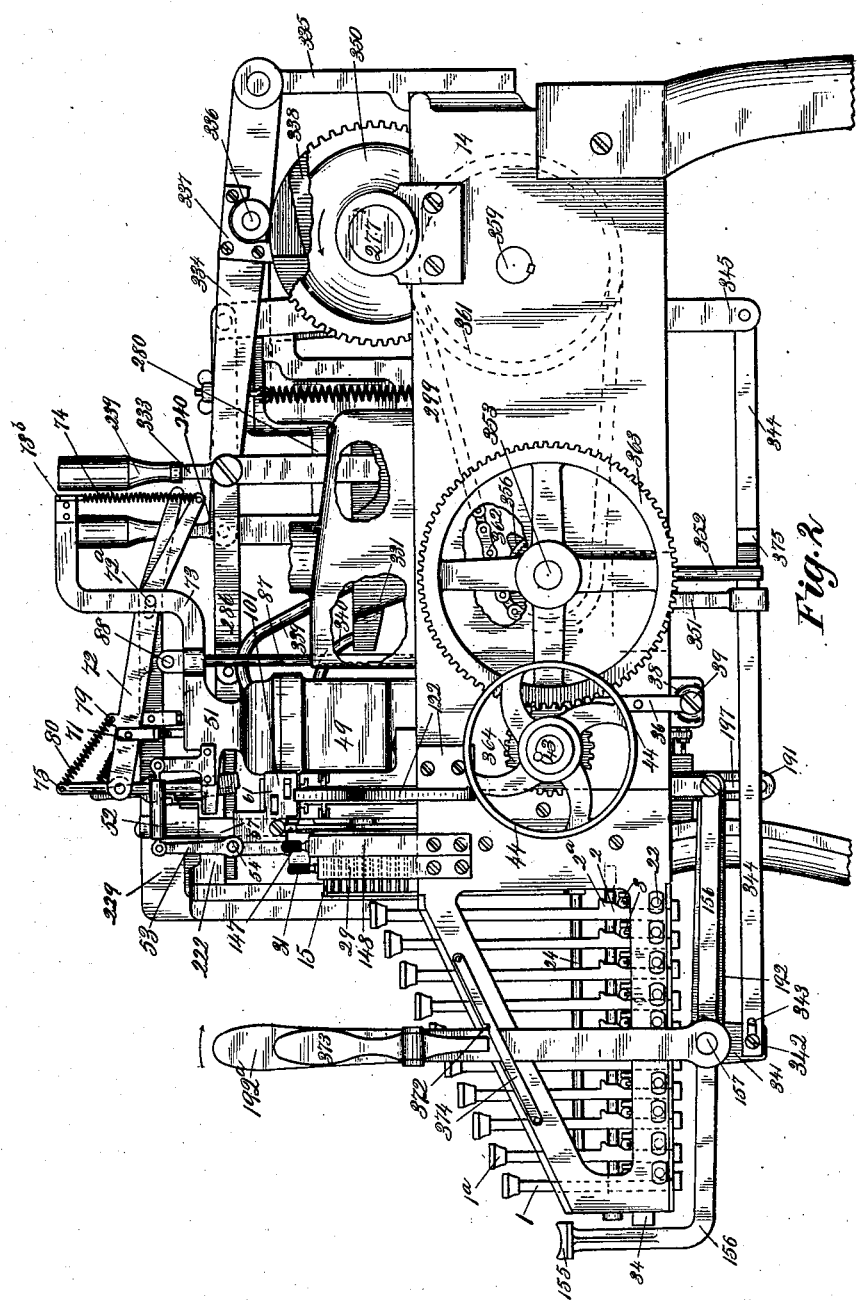
Figure 3:
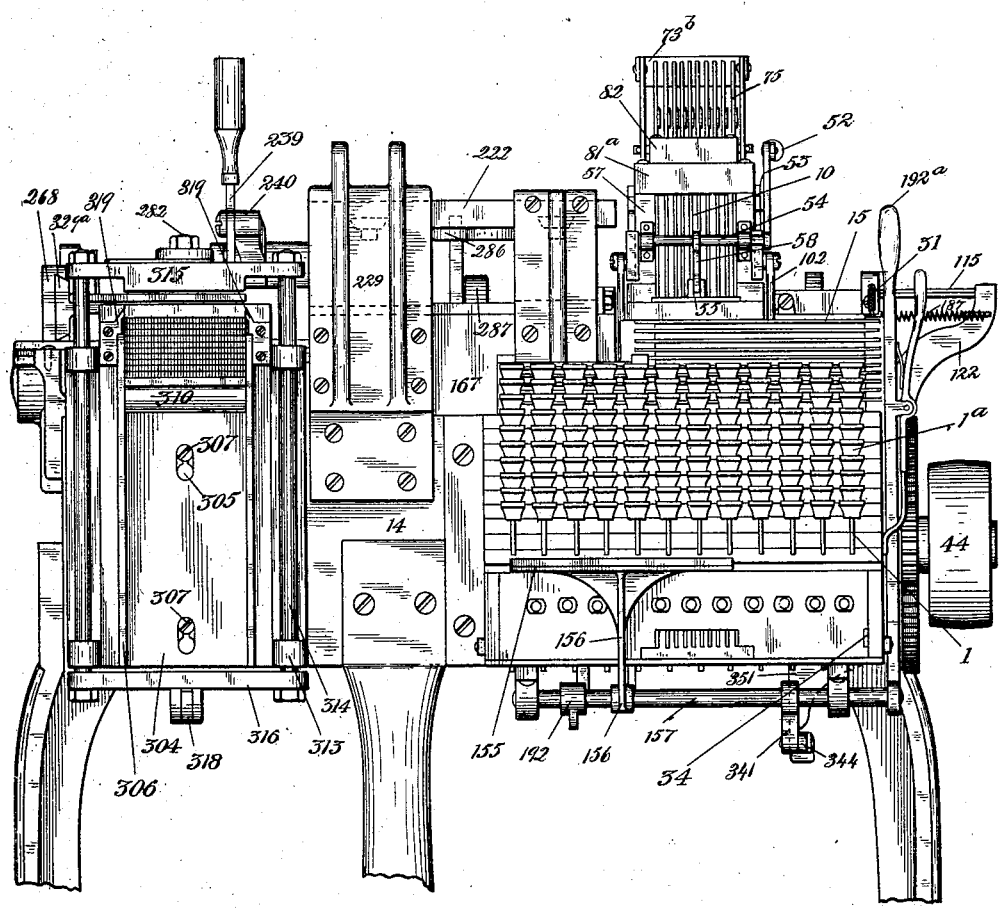
Figure 4:
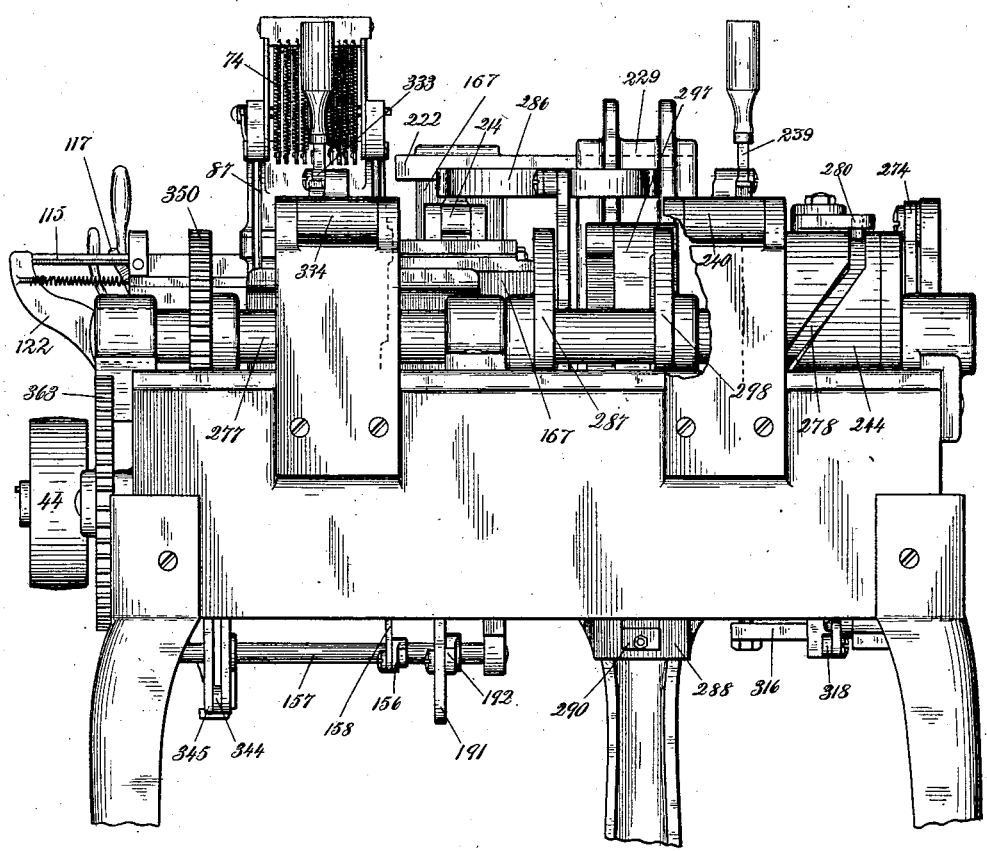
Figure 5:
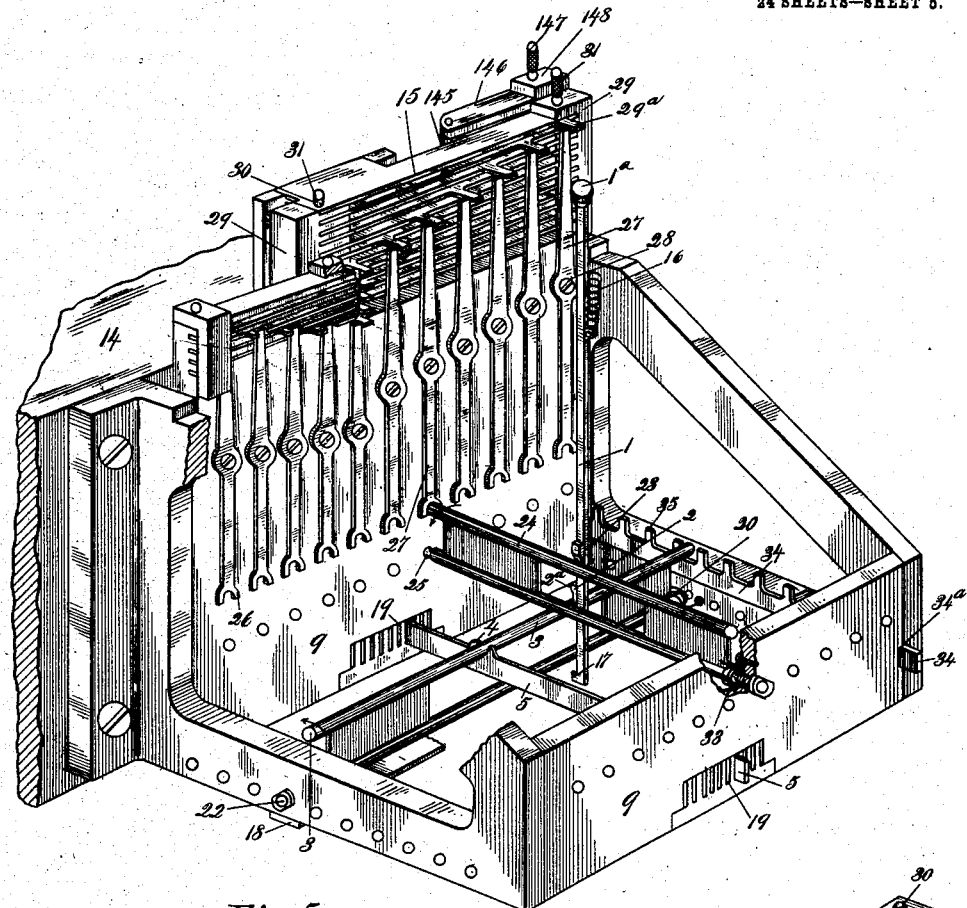
Figures 8, 11:
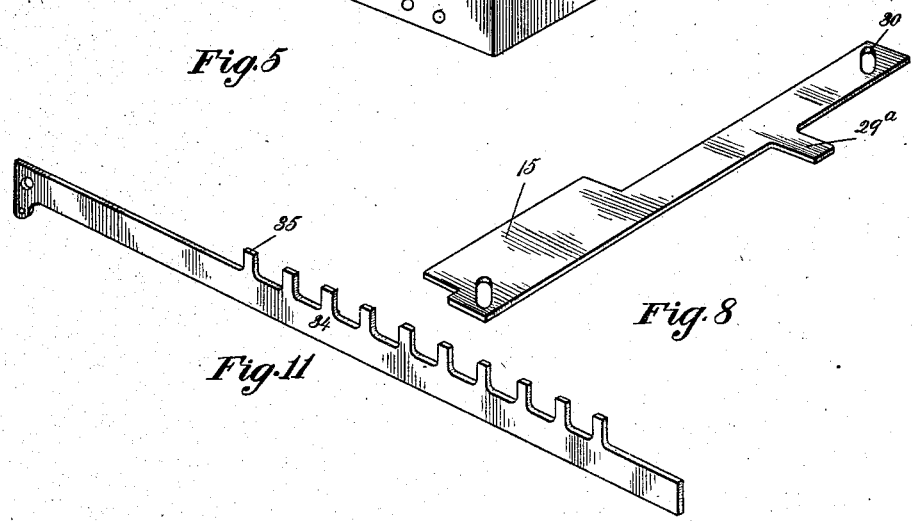
Figure 6:
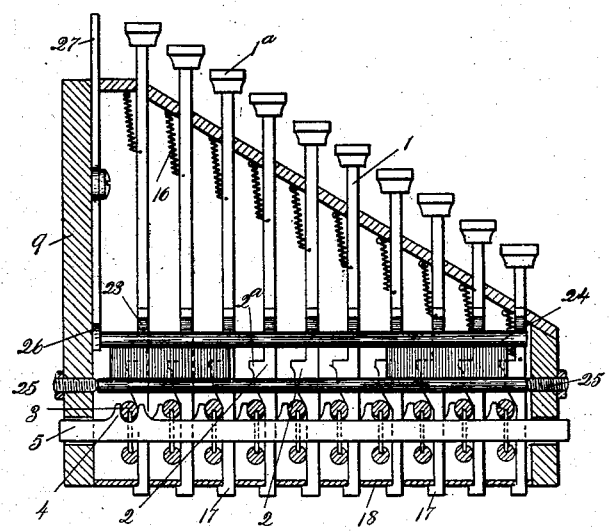
Figure 9:
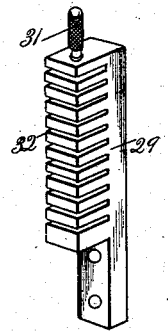
Figure 32:
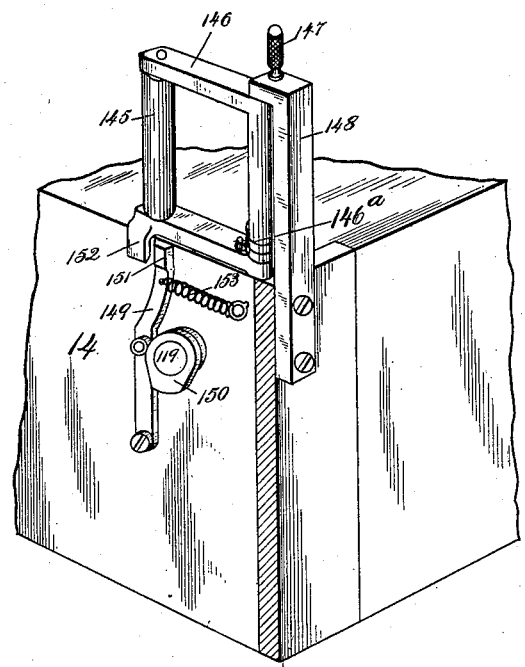
Figure 13:
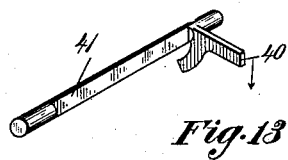
Figure 12:
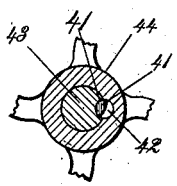
Figure 7:
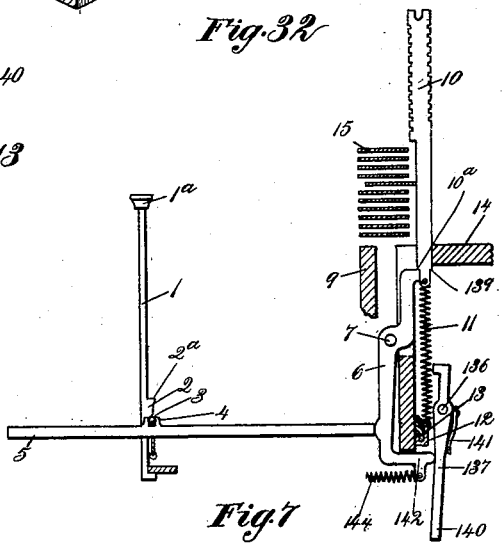
Figure 10:
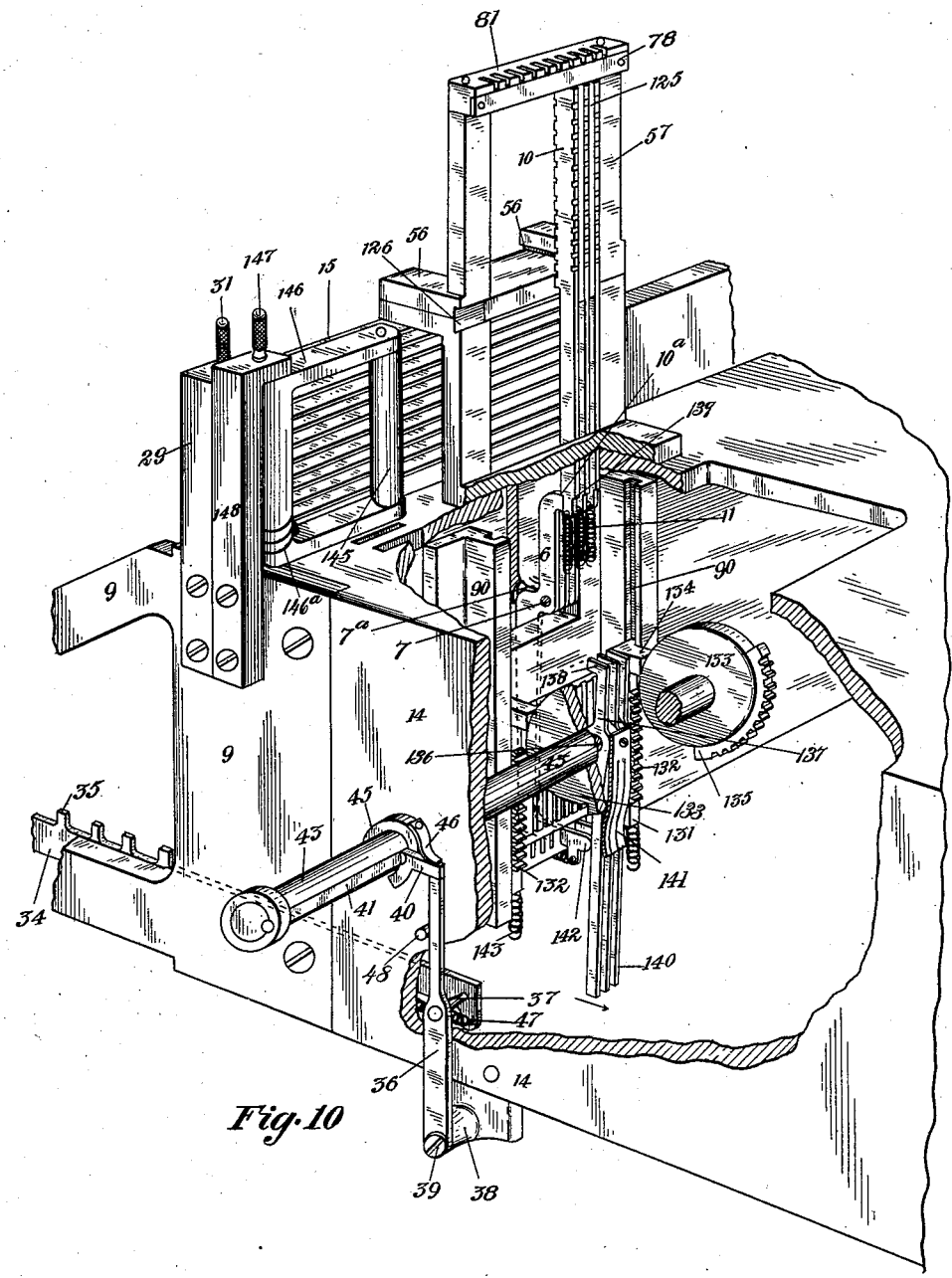
Figure 14:
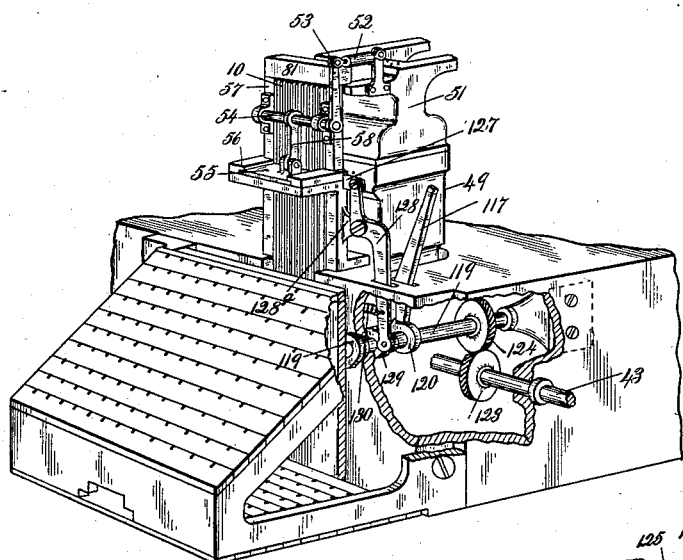
Figure 15:
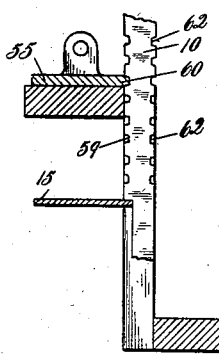
Figure 19:
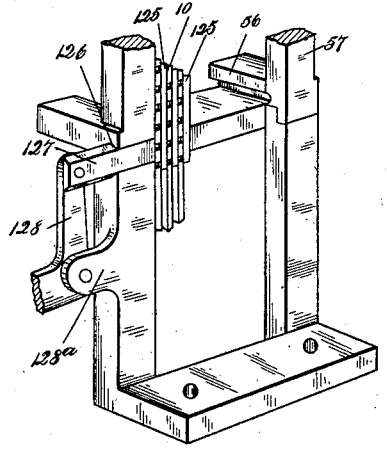
Figure 18:
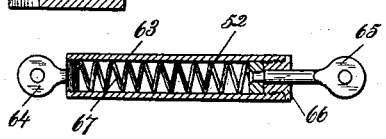
Figure 23:
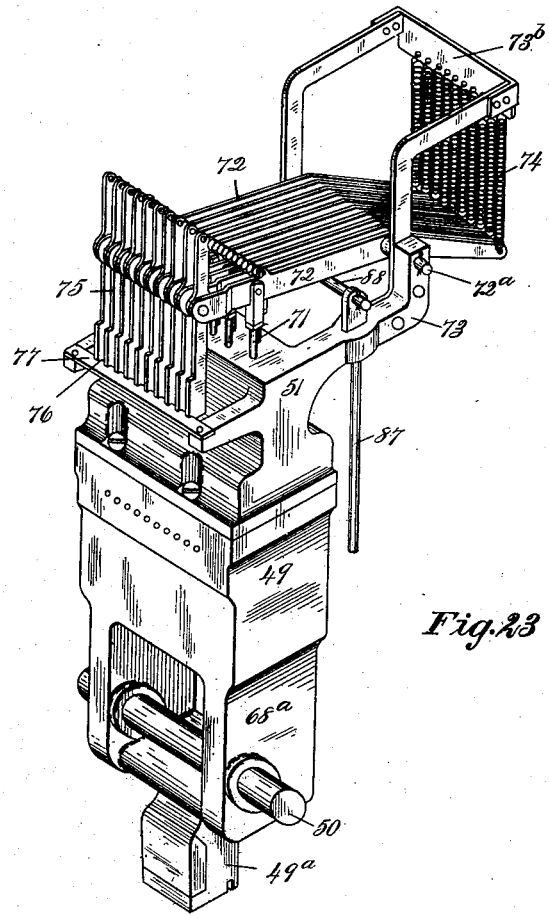
Figure 27:
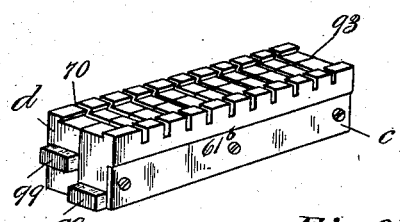
Figure 24:
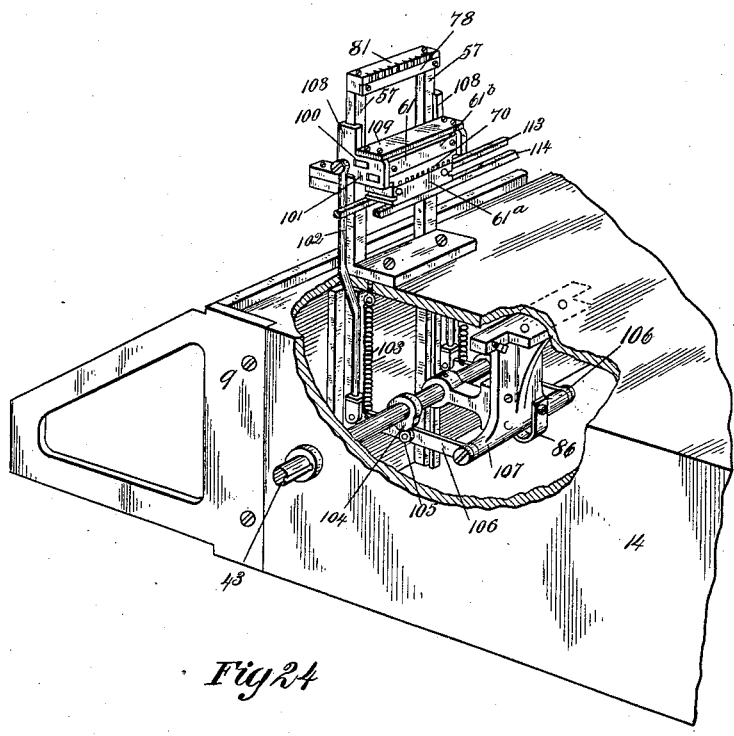
Figure 25:
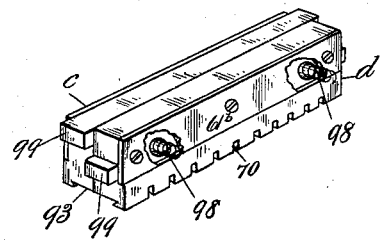
Figure 26:
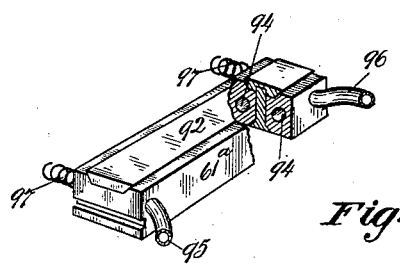
Figure 31:
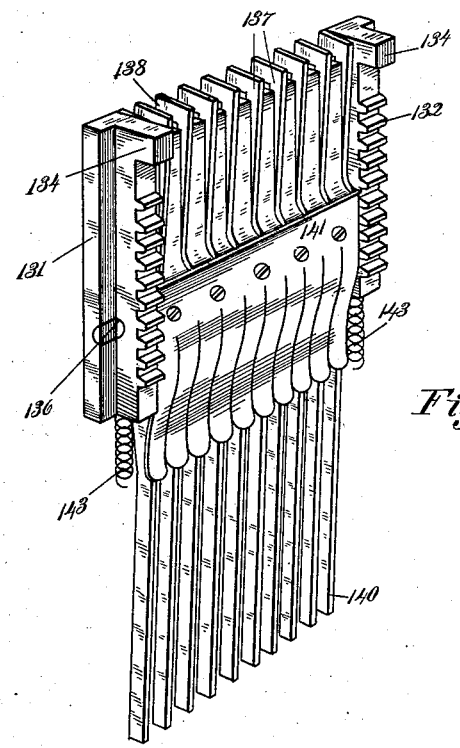
Figure 57:
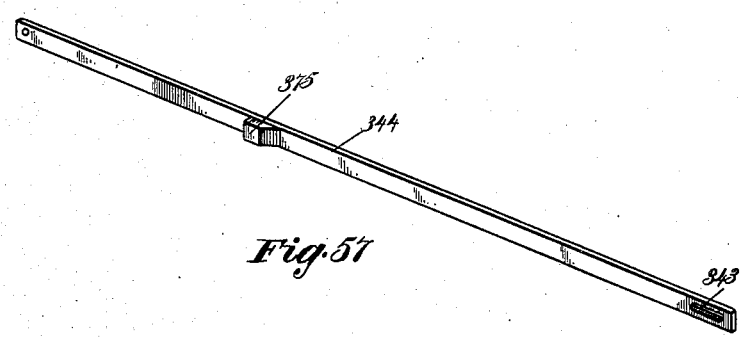
Figure 33:
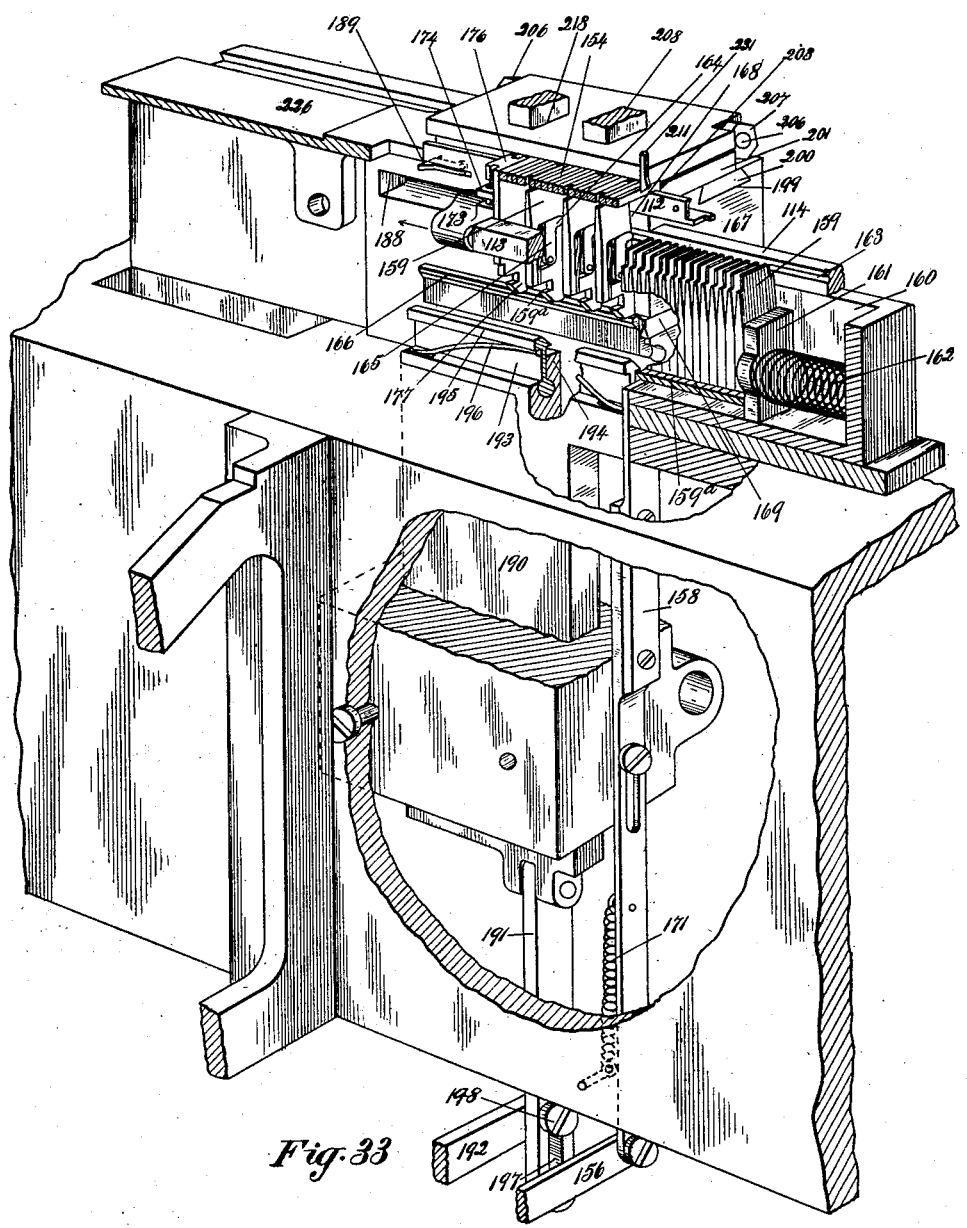
Figure 34:
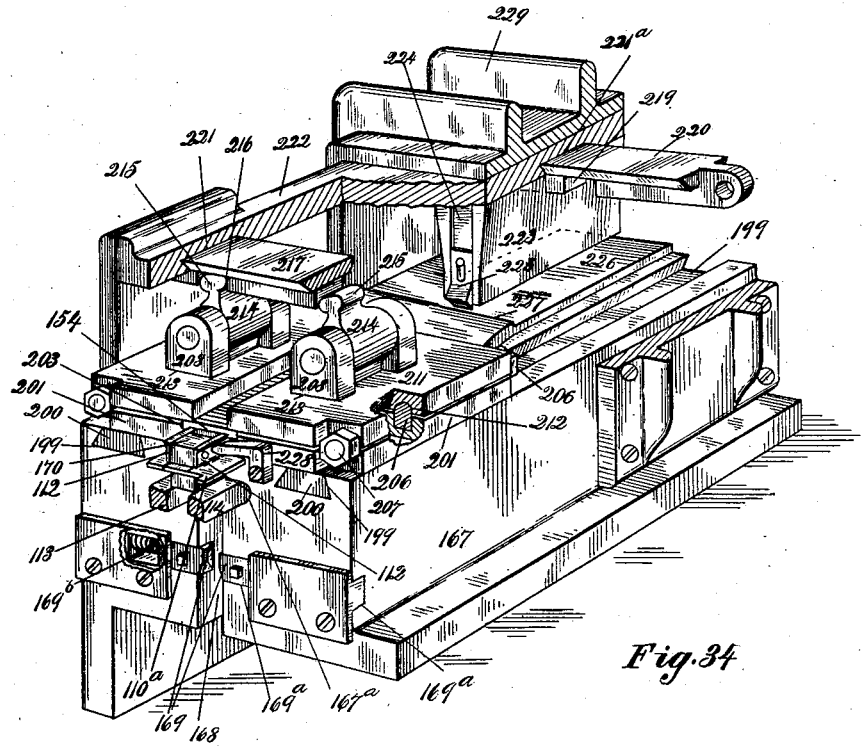
Figure 35:
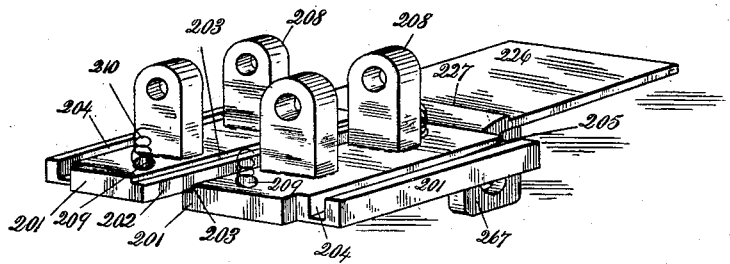
Figures 36, 37, 38, 58:
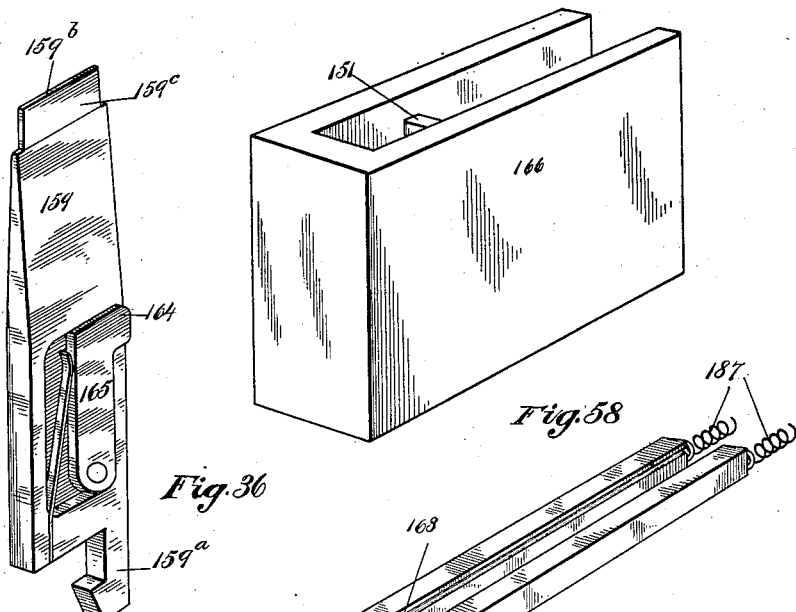
Figures 47, 48:
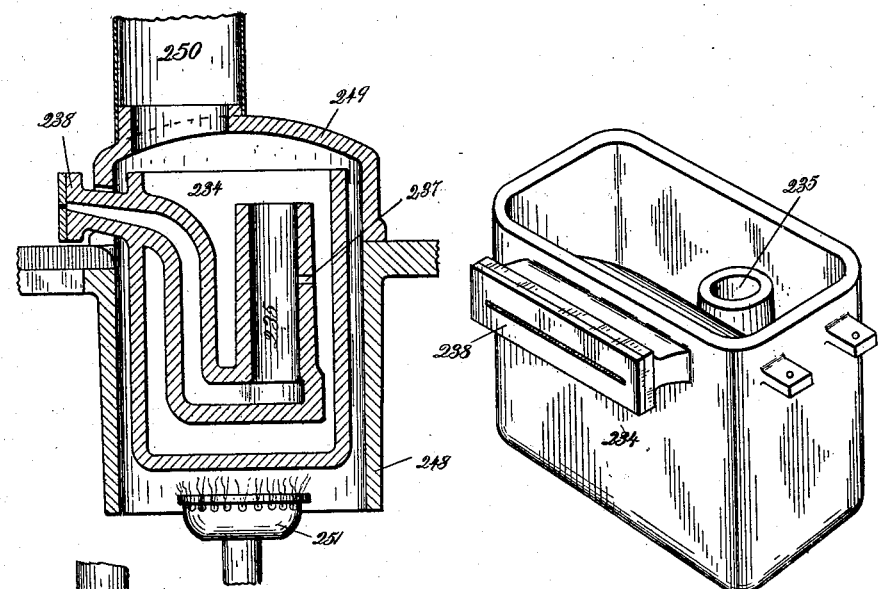
Figure 49:
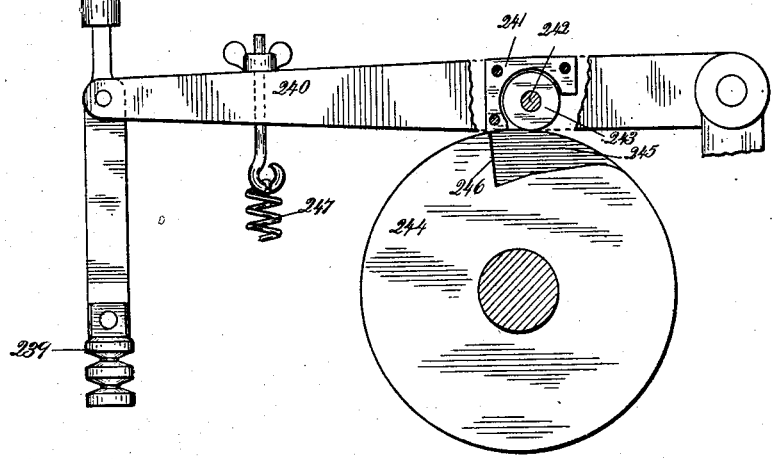
Figure 50:
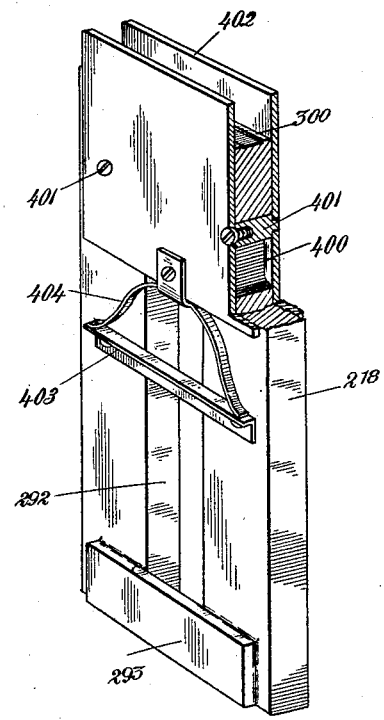
Figure 53:
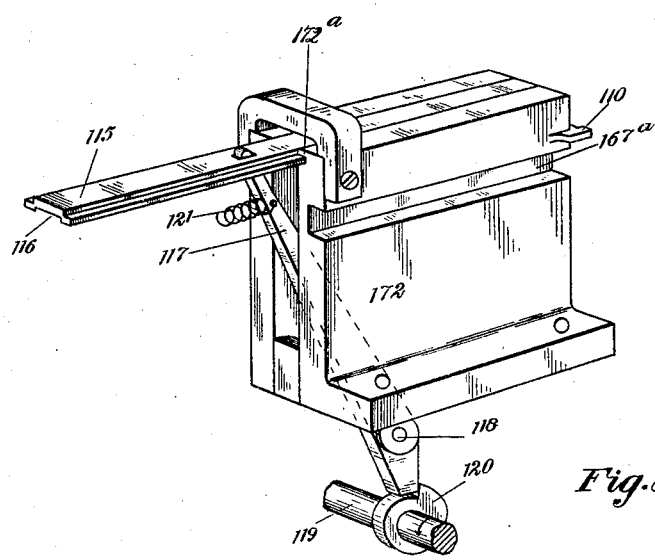
Figure 54:
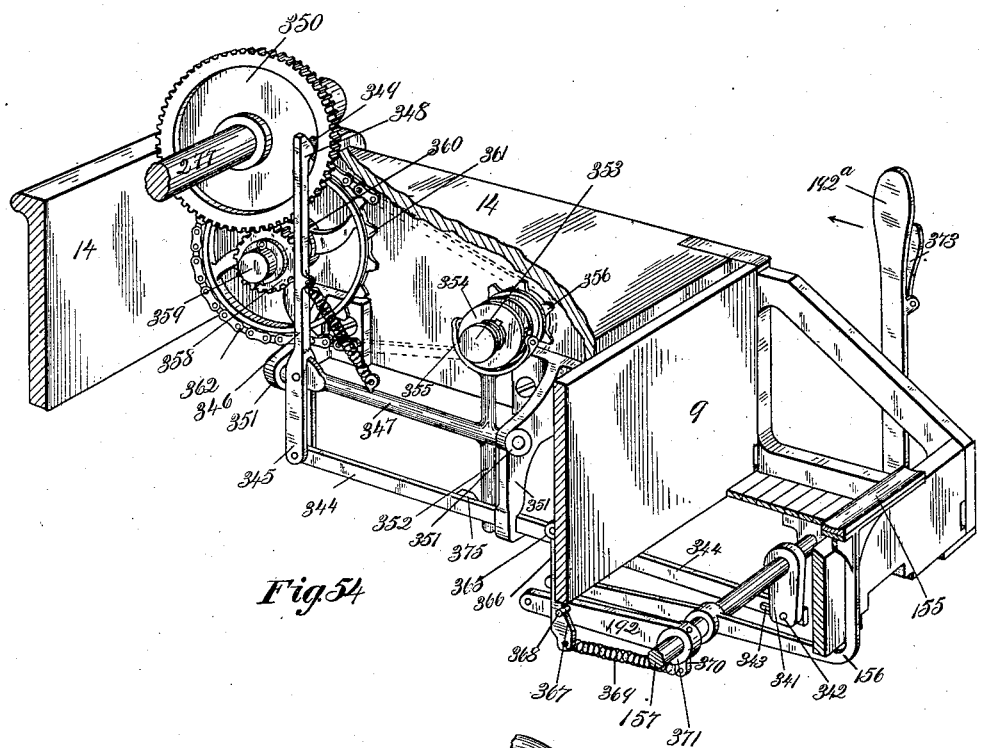
Figures 55, 56:
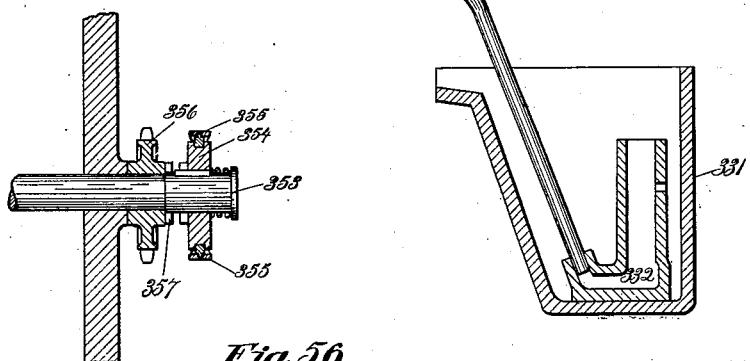

In the drawings—Figure 1—is a plan view of the entire machine. Fig. 2—is a side elevation of the same. Fig. 3—is a front elevation of the same. Fig. 4—is a rear elevation of the same. Fig. 5—is a perspective view of the interior of the key board, showing the stopping plate levers, a rocker shaft for actuating one of the stopping plate levers, a matrix bar releasing slide, the high speed mechanism starting slide, a rocker shaft for actuating the matrix bar releasing slide and the high speed starting slide. Fig. 6—is a sectional view of the same. Fig. 7—is a sectional view showing one of the key rods, the matrix bar releasing slide, the matrix bar starting dog, the matrix bar, the matrix bar stopping plates, the matrix bar return dog and the matrix-bar-releasing-slide-rocker shaft. Fig. 8—is a perspective view of a stopping plate. Fig. 9—is a perspective view of one of the stopping plate posts and combs. Fig. 10—is a perspective view of a portion of the machine, (looking at it from the rear), showing the high speed driving mechanism, the matrix bar, stopping plates, and the matrix bar and stopping plate return mechanism. Fig. 11—is a perspective view of the high speed starting slide. Fig. 12—is a section of the hub of the driving pulley for the high speed shaft. Fig. 13—is a perspective view of the clutch dog for the high speed shaft and driving pulley. Fig. 14—is a perspective view of a portion of the machine, showing the matrix bars and the matrix bar alining mechanism. Fig. 15—is a side elevation of a section of a matrix bar, the matrix bar alining slide and a stopping plate. Fig. 16—is a vertical section showing a matrix bar, the matrix bar alining slide, the stopping plates, the matrix bar supporting dog, the matrix bar return dog, the mold, the type metal pot, the type metal pot plunger and spring tensioned lever and the oscillating mechanism for the type metal pot. Fig. 17—is a rear elevation of the same. Fig. 18—is a sectional view of the adjustable spring tensioned link for the alining mechanism. Fig. 19—is a perspective view of a section of the matrix bar frame and several of the matrix bars, (looking at them from the rear), showing the guides for the matrix bar alining slide and matrix bar locking up mechanism. Fig. 20—is a perspective view of the matrix bar frame, (looking at it from the rear), showing the grooves for the matrix bar alining and locking slides. Fig. 21—is a perspective view of one of the matrix bars. Fig. 22—is a perspective view of one of the packing pieces. Fig. 23—is a perspective view of the type metal pot. Fig. 24—is a perspective view of the type casting mold and operating mechanism. Fig. 25—is a perspective view of the upper mold section. Fig. 26—is a similar view of the lower mold section, partly broken away. Fig. 27—is a perspective view of the upper mold section inverted. Fig. 28—is a perspective view of a molded type. Fig. 29—is a perspective view showing the type ejecting and assembling mechanism. Fig. 30—is a view showing the ejector lever, cam and ejector slide. Fig. 31—is a perspective view of the matrix bar return slide. Fig. 32—is a perspective view of the stopping plate return mechanism. Fig. 33—is a perspective view showing the type assembling, justifying and spacing mechanisms, the auxiliary line carriage, word spacers and co-acting parts, a partially filled line and a section of the line carriage. Fig. 34—is a perspective view of the type assembling mechanism, line carriage and co-acting parts. Fig. 35—is a perspective view of the lower plate of the line carriage and the line carrying plate. Fig. 36—is a perspective view of a word spacer. Fig. 37—is a perspective view of the auxiliary line carriage. Fig. 38 is a sectional view of the line assembling head. Fig. 39—is a perspective section, showing the justifying strip casting mechanism, the line carriage and the mechanism for impressing the lead strip into the alining grooves of the type. Fig. 40—is a perspective view of the protecting plates for keeping the type on the type rails. Fig. 41—is a perspective view of the justifying and locking strip. Fig. 42—is a perspective view showing the justifying and locking strip impressed into the alining grooves of the type. Fig. 43—is a perspective view of a portion of the lead strip after having been impressed into the alining grooves of the type showing the protuberances which are formed in the word spacers. Fig. 44—is a perspective view of the lead strip metal pot, mold and actuating mechanism. Fig. 45—is a perspective view of the back section of the lead strip mold. Fig. 46—is a perspective view of the front section of the lead strip mold. Fig. 47 is a perspective view of the lead strip metal pot. Fig. 48—is a sectional view of the lead strip metal pot. Fig. 49—is a side elevation of the plunger, spring tensioned lever and operating cam for the lead strip metal pot. Fig. 50—is an enlarged perspective sectional view of the hammer for impressing the justifying and locking strip into the alining grooves of the type. Fig. 51—is a perspective view of the galley and galley operating mechanism. Fig. 52—is a perspective view of the galley slide. Fig. 52ᵃ—is a side elevation of the galley link. Fig. 53—is a perspective view of the type ejecting mechanism. Fig. 54—is a perspective view, partly in section, showing the low speed starting and stopping mechanism. Fig. 55—is a sectional view of the type metal reservoir pot. Fig. 56—is a sectional view of the clutch for the clutch shaft of the low speed mechanism. Fig. 57—is a perspective view of the controlling link for the low speed mechanism. Fig. 58—is a perspective view of the word spacer box.

Like numerals of reference refer to like parts throughout the specification and drawings.

*Matrix bar releasing mechanism.* (See Figs. 1, 2, 3, 5, 7, 8, 10, 14 and 16).—The key rods 1 moving vertically through the top of the key board frame 9 are provided with touch buttons 1ᵃ bearing appropriate characters corresponding with the characters of the matrix bars. The depression of a key rod 1 causes a key rod cam 2 to oscillate a rocker shaft 3 forward against a lug 4 of a matrix bar releasing slide 5 and move the matrix bar releasing slide forward to engage and actuate a matrix bar supporting dog 6 to release a matrix bar 10. The matrix bar supporting dogs 6 are fulcrumed on a shaft 7 held by the arms 7ᵃ of a bracket 7ᵇ forming part of the key board frame 9, and are arranged to support the matrix bars 10 in their normal position under tension of the accelerating springs 11, connected to the lower ends of the matrix bars 10 and to a hook shaped plate 12 interlocking with the hook shaped lug 13, fastened to the adjacent side of the main frame 14. The matrix bars 10 move in a fixed path to and from the casting point, being guided by vertical combs 21 connected to the main frame 14 in juxtaposition to the lower ends of the matrix bars. The forward movement of a matrix bar releasing slide 5 actuates a matrix bar supporting dog 6 to release a matrix bar 10, which accelerated by a spring 11 descends until arrested by a stopping plate 15, interposed in its path co-incident with the forward movement of the matrix bar releasing slide 5. The movement of the key rod after actuating the rocker shaft 3 is arrested by the lug 2ᵃ integrally formed with the key rod cam 2, coming into contact with the rocker shaft 3, the key rod 1 when released being returned to its normal position under the tension of springs 16 connected to the key rod and to the key board frame 9, the return movement of the key rod when completed being arrested by a stop 17 engaging the key rod stopping plate 18 extending horizontally across the row or bank to which the operated key rod belongs. The rocker shafts 3 extend horizontally across the key board frame 9 and their ends are mounted on pivots 22 projecting inwardly from the sides of the key board frame 9. Coiled on the rocker shafts 3 are the rocker shaft return springs 20 connected to the rocker shafts and to the key board frame 9 to return the matrix bar releasing slides 5 and rocker shafts 3 to their normal position when released by the return of the key rods, the movements of the matrix bar releasing slides 5 being guided by horizontal combs 19 formed in the key board frame 9, each matrix bar releasing slide 5 being caused to move horizontally in a fixed path when operated to actuate its respective matrix bar supporting dog 6, and when returning to its normal position.

*Matrix bar stopping plate mechanism.* (See Figs. 1, 2, 3, 4, 5, 7, 8, 9, 10 and 16.)—The operation of a key rod 1 co-incident with the release of a matrix bar 10 causes the key rod cam 23 to actuate a rocker shaft 24, the ends of which are mounted on pivots 25 similar to the pivots 22 for the rocker shafts 3. Each rocker shaft 24 engages the forked end 26 of its respective stopping plate lever 27 fulcrumed on a stud 28 connected to the key board frame 9, the opposite end of the stopping plate lever 27 engaging a lug 29ᵃ projecting outwardly from the stopping plate 15. The oscillation of the rocker shaft 24 in the direction indicated by arrow in Fig. 5 actuates the stopping plate lever 27 to project a stopping plate 15, into the path of the released matrix bar, to position the character to be reproduced, the movements of the stopping plate 15 being guided and supported by combs 32 integrally formed with or connected to the stopping plate posts 29. The stopping plate posts 29 are fitted with stopping plate retaining studs 31 passing through oblique slots 30 in the ends of the stopping plates 15, through the medium of which the stopping plates have a limited reciprocating motion in an oblique direction when moving to and returning from the path of the matrix bars. The movement of a rocker shaft 24 actuates the stopping plate lever 27 to interpose a stopping plate 15 in the path of the released matrix bar 10 to position or bring the character, represented by the operated key rod, opposite the point of reproduction, the stopping plate being returned to the comb by the stopping plate return mechanism, hereinafter described, when the reproduction of the positioned character has been effected. Connected to the rocker shafts 24 and to the key board frame 9 are the rocker shaft return springs 33 to return the rocker shafts and stopping plate levers to their normal position when released by the key rod cams 23 on the return of the key rods to their normal positions.

*The high speed starting mechanism.* (See Figs. 2, 3, 5, 10, 11, 12 and 13.)—The operation of any one of the key rods 1 oscillates a rocker shaft 3 against a lug 35 of the high speed mechanism starting slide 34, the movements of which are guided by vertical slots 34ª formed in the key board frame 9. One end of the high speed mechanism starting slide 34 is connected by a pin 37 to an oscillating arm 36, one end of which is fulcrumed by a screw 39 to the stud 38 forming part of the main frame 14, the opposite end of the oscillating arm 36 normally supporting the spring tensioned trip dog 40 of the pivoted clutch member 41. The clutch member 41 is solidly formed with the spring tensioned dog 40 and normally lies in the longitudinal recess 43ª of the high speed shaft 43. Rigidly mounted on the high speed shaft 43 contiguous to the spring tensioned trip dog 40 is a collar 45 and connected to the collar 45 is the tension spring 46 for the trip dog 40. The spring tensioned trip dog when released by the oscillating arm 36 is moved by the tension spring 46 in the direction indicated by arrow in Fig. 13 of the drawings to enable the clutch member 41 to register in the recess 42 of the driving pulley 44 and cause the high speed shaft 43 to rotate unitedly with the driving pulley 44 until the spring tensioned trip dog 40 has made a complete revolution and has again been brought into engagement with the end of the oscillating arm 36. The engagement of the spring tensioned trip dog 4 with the end of the oscillating arm 36 trips the clutch 41 out of the recess 42 and allows the high speed shaft 43 to remain stationary during the continued revolution of the driving pulley 44. Co-incident with the return of the rocker shaft 3 the high speed mechanism starting slide 34 and oscillating arm 36 are returned to their normal position by the starting slide return spring 47, the return movement of the arm and slide being arrested by the stop 48.

*The matrix bar alining and type casting mechanism.* (See Figs. 1, 2, 3, 14, 15, 16, 18, 19, 23, 24, 25, 26, 27 and 29.)—The type metal pot 49 is fitted with a removable top 51 to which is connected one end of the adjustable spring tensioned link 52, the opposite end of the link being connected to the crank 53 of the alining slide rocker shaft 54. The alining slide 55 extends horizontally across the front of the matrix bars 10 and moves back and forth in stationary horizontal guides 56 forming part of the matrix bar frame 57. Connected to the rocker shaft 54 and to the alining slide 55 is a crank 58 by means of which motion is transmitted from the rocker shaft 54 to the alining slide 55. The front of each of the matrix bars 10 is fitted with a series of tapering notches 59 to receive the tapering edge 60 of the alining slide 55 and facilitate its entry therein when actuated to aline the positioned character. The type metal pot 49 oscillates on a shaft 50 suitably supported in the main frame 14, the forward oscillation of which causes the forward movement of the crank 53 and the rearward movement of the crank 58 and alining slide 55. The rearward movement of the alining slide 55 causes the tapering edge 60 to enter the tapering notches 59 of the matrix bars 10 to aline the character to be reproduced and hold the matrix bars firmly against the mold 61 during the casting operation, the forward oscillation of the type metal pot being so timed as to permit of the positioning of the character of the released matrix bar before the alining slide is actuated. The adjustable spring tensioned link 52 consists of a cylinder 63 having at one end a stationary head 64 and at the other end a movable slide 65, the outward movement of which is limited by a lock nut 66 adjustably fitted into the adjacent end of the cylinder to increase or decrease the tension of the spring 67, this construction enabling the spring tensioned link to compensate for the difference between the movements of the metal pot and alining slide. The type metal pot 49 is fitted with a series of wells 68 corresponding to the number of cavities 70 in the mold 61, the mold cavities 70 corresponding in number and location with the matrix bars 10. Each of the wells 68 is fitted with a plunger 71 connected to a spring tensioned lever 72 fulcrumed on a shaft 72ª supported by the arms 73 connected to the removable top 51. The tension springs 74 are connected to the rear ends of the levers 72 and to a plate 73ᵇ secured to the rearwardly projecting ends of the arms 73. Pivoted to the front ends of the levers 72 are lever supporting arms 75, the lower ends of which have shoulders 76 normally resting on a support 77, forming part of the removable top 51, and normally resting on the top of the matrix bar 10 are tripping plates 78. Co-incident with the descent of a matrix bar 10 the tripping plate 78 supported by it descends until arrested by a stop 78ª connected to the top of the matrix bar frame 57 and engages the front face of the lower end of the lever supporting arm 75. When the character of the matrix bar to be reproduced has been positioned the type metal pot is oscillated forward, carrying with it the spring tensioned lever 72 and upper end of the lever supporting arm 75, tilting the upper end of the supporting arm 75 into a forwardly oblique position. The forward tilting of the lever supporting arm 75 causes the lower end of the lever supporting arm to engage the tripping plate 78 and dislodge the shoulder 76 from the support 77. When the shoulder 76 has been dislodged the spring tensioned lever 72 and its respective plunger 71 descends, the plunger forcing the metal from its respective well through its respective spout channel to its respective mold cavity 70.

Connected to the lever supporting arms 75 and to the lugs 79 of the spring tensioned levers 72 are tension springs 80 to hold the lever supporting arms normally in such a position as to enable the shoulders 76 to engage the support 77. The matrix bar frame 57 is fitted with a cap 81 having vertical slots 81ª to guide the vertical movement of the tripping plates 78, the lateral displacement of the tripping plates from the guides being prevented by the stop 78ª and fitted to the top of the cap 81 is a comb 82 having chambers for the springs 83 which accelerate the descent of the tripping plates 78. When the type metal pot has completed its forward oscillation the lever supporting arm is dislodged by the tripping plate of the released matrix bar 10 and the plunger under the influence of the spring tensioned lever 72 instantaneously descends and forces the type metal from the type metal pot well through the spout to the mold cavity 70 of the released matrix bar. Each of the type metal pot wells 68 is provided with an inlet 84 for the admission of the type metal from the crucible of the type metal pot 49, the contents of which are maintained continuously at the level of the overflow, as hereinafter described in connection with the reservoir type metal pot. The lower end of the type metal pot frame is fitted with a downward extension 49ª contiguous to the high speed shaft 43 upon which is mounted the type metal pot oscillating cam 85. The type metal pot shaft 50 passing through the front of the type metal pot frame 68ª enables the type metal pot to oscillate by gravity from the type mold 61 when the downward extension 49ª has been relieved from the pressure of the type metal pot cam 85, the oscillation being accelerated by the tilting spring 86 connected to a bracket 107 of the main frame 14 and engaging the type metal pot extension 49ª. On each revolution of the high speed shaft 43 the type metal pot cam 85 engages the extension 49ª and tilts the type metal pot 49 against the adjacent face of the mold 61, holding it firmly against the mold until the type metal has been ejected from the type metal well into the mold cavity 70. When the type metal has been ejected from the type metal well into the mold cavity the spring tensioned lever 72 and the supporting arm 75 are raised by the yoke 88 of the lever lifting rods 87, the lever lifting rods holding the spring tensioned lever 72 in its raised position until the type metal pot has tilted away from the type mold. Pivotally connected to the lower ends of the lever lifting rods 87 and to the matrix bar return frame guides 90 are links 89 fitted with rollers 91 engaging the cams 85ª mounted on and revoluble with the high speed shaft 43 in juxtaposition to the links 89. When sufficient time has elapsed for the molding of the type the cam 85 disengages itself from the extension 49ª, and the type metal pot returns by gravity to its normal position, the return of the type metal pot being accelerated by the tilting spring 86. When the type metal pot has been tilted away from the mold the tension spring 80 moves the lower end of the supporting arm 75 into position to enable the shoulder 76 to engage the support 77. When the shoulder 76 has engaged the support 77 the cams 85ª permit the lever lifting rods and yoke to return by gravity to their normal position, in which they are clear of the path of the spring tensioned levers when descending, on the next operation of the machine.

*Type molding mechanism.* (See Figs. 1, 2, 16, 17, 24, 25, 26, 27, 29 and 34.)—The type mold 61, consisting of a bottom section or drag 61ª and a top section or cope 61ᵇ vertically movable from the bottom section 61ª, is mounted on the mold supporting rails 113 and 114 respectively, the mold section 61ª being fitted with a spring 97 which bears against the adjacent face of the matrix bar frame 57 to move the bottom mold section 61ª from the matrix bars 10 when relieved of the pressure of the type metal pot. The top of the bottom section 61ª is fitted with a dove tail core 92 which registers in a correspondingly shaped recess 93 in the bottom of the top section 61ᵇ, the recess 93 closely embracing the core 92 when the mold sections are assembled. Formed transversely through the top section 61ᵇ are a series of mold cavities 70 connected with the dove tail recess 93 and contained in the mold cavities 70, when the mold parts are assembled, is the dove tail core 92 to form the dove tails in the molded type 54, shown in Fig. 28 of the drawings. Owing to the dove tail groove each molded type necessarily adheres to the dove tail core and in order to remove the type from the mold it is necessary to separate the top and bottom mold sections. The separation of the mold sections is accomplished by making the top section 61ᵇ in two parts, "c" and "d" respectively, separated laterally by the action of expanding springs 98, the ends of each of the parts "c" and "d" being provided with outwardly directed lugs 99 contained in the elongated slots 100 of the lifting plates 101. The slots 100 allow of the lateral movement of the lugs 99 when moving to or away from each other, the distance of movement being sufficient to enable the edges of the recess 93 disengaging themselves from the edges of the dove tail core 92. The lifting plates 101 form part of or are connected to vertically moving lifting levers 102 raised by tension springs 103 and lowered by the cams 104, mounted on the high speed shaft 43, engaging the rollers 105 of the links 106 pivoted to the lower end of the lifting levers 102 and to brackets 107 secured to the main frame 14. Co-incident with the starting of the high speed shaft 43 the cams 104 engage the rollers 105 pressing the links 106 and levers 102 downwards to bring the parts "c" and "d" of the mold sections 61<sup>b</sup> into contact with the mold section 61<sup>a</sup>. The forward oscillation of the type metal pot assembles the mold sections and then presses the mold against the matrix bars. The mold when in this position forms with the matrix bar alining slide 55 a vise to rigidly hold the matrix bars positioned opposite the mold cavities 70 until the casting of the type has been finished. The end movement of the parts "c" and "d" of the top section 61<sup>b</sup> is prevented by providing the lifting plates 101 with guides 108 which embrace the sides of the matrix bar frame 57, the lifting plates being tied together by a tie plate 109 to hold the guides 108 tightly against the matrix bar frame 57. The slots 100 are so arranged with relation to the parts "c" and "d" that they permit them to separate under the influence of the springs 98 when the edges of the recess 93 are being disengaged from the edges of the dove tail core 92. The mold section 61<sup>a</sup> and the section "d" of the mold section 61<sup>b</sup> follow the type metal pot when oscillating or returning to its normal position, the movement of the mold section 61<sup>a</sup> continuing until arrested by the stops 110 and 110<sup>a</sup> forming part of the ejecting bracket 111 and top guide rails 112 respectively. The outward movement of the mold section 61 enables the dove tail core 92 to disengage itself from the edge of the dove tail groove contained in the part c of the mold section 61<sup>b</sup>. After the stoppage of the mold section 61<sup>b</sup> by the stops 110 and 110<sup>a</sup> part d of the mold section 61<sup>b</sup> continues its outward movement from the section c until the edge of the dove tail recess formed in it disengages itself from the adjacent edge of the dove tail core 92. When the edges of the dove tail recess 93 are disengaged from the edges of the dove tail core 92 the cams 104 move to permit the springs 103 to lift the actuating rods 102 and lifting plates 101 to vertically separate the mold section 61<sup>b</sup> from the mold section 61<sup>a</sup>, raising the mold section 61<sup>b</sup> clear of the molded type on the dove tail core 92. For cooling purposes the mold section 61<sup>a</sup> is provided with a waterway 94 in circulation with the water supply and discharge pipes 95 and 96 respectively.

*Type ejecting mechanism.* (See Figs. 1, 2, 3, 4, 14, 29, 30 and 53.)—Co-incident with the separation of the mold sections the type ejecting slide 115 is actuated to eject the molded type from the dove tail core 92 and deliver it to the line assembling carriage. The type ejecting slide 115 moves longitudinally in guides 172<sup>a</sup> in the top of the type ejector frame 172, and formed in the under face of the ejecting slide 115 is a groove 116 in which registers the dove tail core 92 when the ejecting slide is moving longitudinally across the top of the mold section 61<sup>a</sup>. The type ejecting slide 115 is actuated by a spring tensioned ejecting slide lever 117 fulcrumed on a stud 118 contiguous to the auxiliary high speed shaft 119, and mounted on the auxiliary high speed shaft 119 is a cam 120 which actuates the spring tensioned lever 117 to move the type ejecting slide 115 longitudinally across the top face of the bottom mold section 61<sup>a</sup>. The ejecting end of the type ejecting slide 115 is of substantially the same shape and size as the side of the type to engage the full length of the type when ejecting it and cause it to move parallel with the top of the mold section. When the type ejecting slide 115 has ejected the type from the mold section 61<sup>a</sup> and delivered it to the line assembling carriage the cam 120 releases the ejecting slide lever 117 which then returns with the ejecting slide 115 to their normal position under the influence of the ejecting slide return springs 121 connected to the spring tensioned lever 117 and to an arm 122 projecting outwardly from the side of the main frame 14, the arm 122 serving also as a stop to arrest the type ejecting slide 115 when the return movement has been effected. The auxiliary high speed shaft 119 is driven from the high speed shaft 43 by spiral gear wheels 123 and 124 respectively mounted on the high speed shaft 43 and auxiliary high speed shaft 119.

*Locking and unlocking of the matrix bars.* (See Figs. 10, 14, 19 and 20.)—Interposed between the matrix bars 10 are packing pieces 125 to hold the matrix bars 10 in a substantially compact mass and prevent the lateral or side movement thereof. The packing pieces 125 are suspended from a horizontal bar 125<sup>a</sup> supported in the matrix bar frame 57 in such a manner as to permit of the packing pieces being readily and quickly removed or replaced, the bar 125<sup>a</sup> being located above the top of the matrix bars 10 and clear of contact therewith. In the back face of the matrix bar frame 57 is a horizontal dove tail groove 126 in which moves the matrix bar locking slide 127 actuated by the spring tensioned lever 128 fulcrumed to a bracket 128<sup>a</sup> forming part of the matrix bar frame 57. The spring tensioned lever 128 is actuated by a cam 129 mounted on the auxiliary high speed shaft 119. When a matrix bar is released and the character positioned the cam 129 actuates the spring tensioned lever 128 to move the matrix bar locking slide 127 against the adjacent matrix bar 10 and force the matrix bars and packing pieces towards the opposite side of the matrix bar frame 57 to hold them against lateral motion. With the return of the matrix bar alining slide 55 to its normal position the spring tensioned lever 128 is free from the influence of the cam 129 and is returned to its normal position by a locking slide return spring 130 connected to the lever 128 and to the main frame 14. The return of the spring tensioned lever 128 actuates the matrix bar locking slide 127 to release the matrix bars and packing pieces of the locking pressure to allow of the operated matrix bar being returned to its normal position by the operation of the matrix bar return mechanism.

*The matrix bar return mechanism.* (See Figs. 7, 10, 16, 17, and 31.)—The return of the matrix bars 10 is effected by the matrix bar return frame 131 moving vertically in the matrix bar return frame guides 90. The sides of the matrix bar return frame 131 are fitted with racks 132 with which mesh the teeth of the segmental gear wheels 133 mounted on the high speed shaft 43. The upper ends of the racks are fitted with outwardly projecting shoulders 134 to receive the impact of the shoulders 135 of the segmental gear wheels 133 at the commencement of their revolutions. The impact of the shoulders 135 against the outwardly projecting shoulders 134 slightly raises the racks and causes the positive engagement of the teeth of the segmental gear wheels and racks. During the engagement of the teeth of the segmental gear wheels with the teeth of the racks the matrix bar return frame 131 is raised to its full limit to allow a spring tensioned matrix bar lifting dog 137 to raise the operated matrix bar 10 and to restore it to its normal position in the matrix bar frame 57. Journaled in the matrix bar return frame 131 is a matrix bar return shaft 136 upon which are loosely mounted the spring tensioned matrix bar lifting dogs 137. The heads of the matrix bar lifting dogs 137 are fitted with forwardly directed projections 138 to engage the shoulders 139 at the lower ends of the matrix bars 10. The tension springs 141 for the matrix bar lifting dogs 137 are fastened to the matrix bar return frame 131 and bear against the tails 140 of the matrix bar lifting dogs 137, holding the matrix bar lifting dogs in their normal position before actuation and returning them to their normal position after having been actuated, the tails 140 of the matrix bar lifting dogs 137 being of a slightly greater length than the movement of the matrix bar return frame 131. Each matrix bar supporting dog 6 is fitted with a rearwardly directed projection 142 normally in contact with the front of the tail 140 of its respective matrix bar lifting dog 137. The matrix bar 10 when in its released position displaces the upper end of the matrix bar supporting dog 6 causing the projection 142 to displace the tail 140 and bring the head of the matrix bar lifting dog into position to engage the matrix bar shoulder 139 when actuated to return the operated matrix bar to its normal position in the matrix bar frame 57, the projection 142 continuing to remain in engagement with the matrix bar shoulder 139 until the matrix bar supporting dog, under the influence of the tension spring 144 has again engaged the shoulder 10$^a$ of the matrix bar to prevent the descent of the matrix bar until the matrix bar supporting dog has again been actuated by the operation of a key rod. The engagement of the head of the matrix bar supporting dog 6 with the matrix bar shoulder 10$^a$ enables the operated matrix bar supporting dog 6 to return to its normal position, the return of which allows the operated lifting dog to fall back, from engagement with the matrix bar shoulder 139, into alinement with the unoperated lifting dogs. When the matrix bar has been returned to its normal position and again engaged by the matrix bar supporting dog the segmental gear wheels 133 complete their engagement with the racks 132, and the matrix bar return frame 131 descends by gravity to its normal position, the descent being accelerated by tension spring 143 connected to the matrix bar return frame 131 and to the main frame 14.

*Stopping plate return mechanism.* (See Figs. 1, 2, 5, 10 and 32.)—The stopping plates 15, co-incident with the return of the matrix bars 10 are engaged by a stopping plate return roller 145 journaled in the oscillating frame 146. The oscillating frame 146 is mounted on a pin 147 fitted to the standard 148 projecting upwardly from the top of the key board frame 9. Pivoted to the front of the main frame 14 is a spring tensioned oscillating lever 149, the movable end of which is actuated by the stopping plate return cam 150 mounted on the auxiliary high speed shaft 119. The movable end of the oscillating lever 149 is fitted with a wedge 151 which is adapted to engage the rear face of the downwardly extending lug 152, forming part of the bottom of the oscillating frame 146. Co-incident with the return of the matrix bars the cam 150 actuates the oscillating lever to move the wedge 151 into engagement with the rear face of the lug 152, and actuate the stopping plate return roller 145 to restore the operated stopping plate 15 to its normal position in the stopping plate combs; the oscillating lever 149 when freed from the action of the cam 150 being returned to its normal position under the influence of the tension spring 153, the stopping plate return frame being simultaneously returned to its normal position by a spring 146$^a$ connected to the oscillating frame and to the main frame.

*Type assembling and spacing mechanism.* (See Figs. 1, 2, 3, 29, 33, 34, 35, 36, 37 and 58.)—The type, as it is ejected from the mold, is delivered to the type guide rails 112 located at the end of the type mold 61, the type being assembled on the type guide rails 112 in the order of production, the dove tail grooves of the type engaging the top of the type guide rails 112 in the same manner as that in which they engage the core 92 of the mold section 61ª, the engagement of the dove tail grooves of the type with the top of the type guide rails 112 preventing the displacement of the type from the type guide rails during its assembly thereon. At the front of the key board frame 9 is a spacing key 155 to which is connected a spacing lever 156 oscillating on the low speed stopping and starting shaft 157 and connected to the spacing lever 156 is a vertically movable word spacer ejector 158 for ejecting the word spacers 159 from the word spacer box 160 and inserting them in the assembling line. As it is necessary that there should always be a word spacer in position to be ejected by the word spacer ejector, the word spacer box 160 is provided with a movable follower 161 actuated by a spring 162 to follow the word spacers 159 and press them to the word spacer ejector 158. Located vertically above the word spacer box 160 are the type guide rails 112 on which is assembled the type as it is delivered from the mold. As the type is assembled on the type guide rails 112 the word spacers 159 are moved upward into the assembling line by the word spacer ejector 158 actuated by the operation of the spacing lever 156 and spacing key 155, the word spacers 159 as they are inserted into the assembling line passing between the mold supporting rails 113 and 114 located on opposite sides of the top of the word spacer box and immediately below the type guide rails 112.

The inner face of the mold supporting rail 114 has a longitudinal channel 163 to receive the point 164 of the spring tensioned friction pawl 165 pivoted to the side face of the word spacer 159. When the word spacer is inserted into the assembling line the point 164 of the pawl 165 enters the longitudinal channel 163 and holds the word spacer 159 against vertical displacement until actuated by the justifying mechanism. To insure the word spacers 159 being retained in the assembling line a safety retaining pawl 166 is hinged to the line assembling frame 167 and opposed to the lower ends of the word spacers 159 inserted into the assembling line, the safety retaining pawl 166 co-acting with the spring tensioned friction pawl 165 to prevent the vertical displacement in a downward direction of the word spacers 159 after being moved into the assembling line from the word spacer box. The word spacer box 160 adjoins the type assembling frame 167 and in the type assembling frame is formed a raceway 168 (shown in Fig. 34), for the movement of the word spacers 159 when inserted in the line assembling on the type guide rails located at the top of the raceway. In the type assembling frame are two spring tensioned retaining pawls 169 to prevent the delivery of more than one word spacer from the word spacer box to the assembling line on each operation of the spacing key. The retaining pawls 169 move in horizontal grooves 169ª formed in the type assembling frame 160 and are maintained in their normal position in the raceway 168 by tension springs 169ᵇ. To assist the retaining pawls 169 in preventing the delivery of more than one word spacer on each operation of the spacing key a stopping block 170 is placed in the raceway 168 above the top of the word spacer box 160 in contact with the word spacers in the word spacer box, except the one immediately in contact with the word spacer ejector 158. When the word spacer has been moved into the assembling line the spacing lever 156 and the ejector 158 are returned to their normal position under the influence of the spacing lever return spring 171 connected to the spacing lever 156 and to the main frame 14.

*Line assembling carriage.* (See Figs. 1, 2, 3, 4, 33, 34, 35, 36 and 37.)—Formed in the type assembling frame 167 and in the ejector frame 172 are longitudinal channels 167ª in which are contained the longitudinally movable mold supporting rails 113 and 114. Uniting the ends of the mold supporting rails 113 and 114 within the type assembling frame 167 is the line assembling head 173 and formed in the line assembling head 173 is a vertical guide 174, the side edges of which are fitted with horizontal grooves 175. Moving vertically in the guide 174 is a spring tensioned slide 176 having at its lower end a latch 177 corresponding to the latches 159ª of the word spacers 159. In the upper end of the sides of the slide 176 are horizontal notches 178 corresponding to the horizontal grooves 175 and adapted to register therewith when the slide 176 has been drawn down in the manner hereinafter described. Secured to the under side of the line assembling head 173 is a spring 179 to raise the slide 176 and hold it raised in its normal position.

Formed in the line assembling head 173 is a horizontally disposed chamber 180 and contained in the chamber 180 is a horizontally movable bolt 181 which registers in a shallow recess 182 formed in the adjacent face of the slide 176. The bolt 181 is forced into the shallow recess 182 by a bolt spring 183 contained in the chamber 180, the chamber 180 being fitted with an adjusting screw 184 to increase or decrease the pressure of the spring 183 against the bolt 181. The spring 179 normally lies against the under side of the head 173 and engages the shoulder 185 on the adjacent face of the slide 176. The upward movement of the spring 179, when it has raised the slide 176 into its normal position, as shown in Figs. 37 and 38, is arrested by the spring coming into contact with the underside of the stationary head 173. When the slide 176 has been drawn down, as hereinafter described, the spring 179 is bent into the position shown in dotted lines in Fig. 38, to raise the slide and restore it to its normal position when free from the influence of the lowering or drawing down mechanism. To the ends of the mold supporting rails 113 and 114 and to the arms 122 of the ejector frame are connected springs 187 to return the line assembling carriage to its normal position when the justification of the type has been effected and the word spacers withdrawn from the justified line. During the assemblage of the type and word spacers the line assembling carriage is moved, in the direction indicated by arrow shown in Fig. 33, space by space, until the line assembling head is arrested by the stationary stop 188 forming part of the type assembling frame 167. Pivoted to the type assembling frame 167 in close proximity to the stationary stop 188 are two retaining pawls 189, which during the forward movement of the line assembling carriage pass through the grooves 175 of the vertical guide 174 and enter behind the flange 176$^a$ of the slide 176 to temporarily and securely lock the auxiliary line carriage against return movement until the word spacers have been withdrawn and the slide lowered from the justified line by the action of the justifying mechanism. By reference to Fig. 36 it will be seen that the body of the word spacer 159 is of a substantially wedge shape formation, having at the top a projection 159$^c$ equal to the depth of the largest type to be cast by the machine and of an equal thickness from its top edge 159$^b$ to the top of the body portion to provide an even abutment for the type on both sides of it, during the assembling of the line. When the word spacers 159 are forced into the assembling line by the spacing lever 156, the point of the friction pawl 165 enters the longitudinal channels 163 of the mold supporting rail 114 and forms an engagement therewith, enabling the line assembling carriage to carry the word spacers during its outward movement as indicated by arrow in Fig. 33 of the drawings. Formed in the vertical slide 176 is a vertical slot 186 opposed to the end of the spring 179. By means of the vertical slot 186 the slide 176 can be moved upwards by the justifying slide through the guide 174 independently of any motion of the spring 179.

*Justifying mechanism.* (See Figs. 1, 2, 3, 33, 36, 37, 38 and 50.)—The justifying slide 190 is connected by a link 191 to the crank 192 of the low speed starting and stopping shaft 157 operated by a hand lever 192$^a$. At the top of the justifying slide 190 is a spring tensioned rocking pawl 193, normally in contact with the pawl stop 194, the top of the pawl stop being slightly below the bottom of the head 195 of the rocking pawl 193. When the justifying slide 190 and the rocking pawl 193 are raised by the action of the low speed stopping and starting shaft 157, the head 195 of the rocking pawl 193 interlocks with the latches 159$^a$ of the word spacers and the latch 177 of the line assembling carriage head slide 176, the rocking pawl tension spring 196 permitting the rocking pawl 193 to open sufficiently to clear the inclined faces of the bottom of the latches. The continued upward movement of the justifying slide brings the pawl stop 194 into contact with the under side of the latches 159$^a$ and 177 and the word spacers are forced into the assembled line to complete its justification. After the justification of the line the motion of the justifying slide 190 is reversed, causing the rocking pawl 193 to engage the shoulders of the latches 159$^a$ and 177 and draw the word spacers 159 and slide 176 downward into the same alinement as the word spacers contained in the word spacer box 160. The downward movement of the slide causes the notches 178 to register with the grooves 175 of the vertical guide 174 and enables the line assembling head 173 to pass the retaining pawls 189 on the return of the line assembling carriage to its normal position under the influence of the line assembling carriage return springs 187. During the return movement of the line assembling carriage the latches 159$^a$ and 177 remain in engagement with the rocking pawl 193 until the word spacers and slide have passed the justifying slide 190; the line assembling head 173 moving the word spacers with the line assembling carriage and depositing them in the word spacer box in the order they occupied before being inserted into the assembling line by the operation of the spacing lever. When the slide 176 has cleared the rocking pawl 193 the spring 179 raises the slide to its normal position as shown in Figs. 37 and 38 to contact with the first type delivered to the line assembling carriage on the next operation of the machine. When the word spacers 159 have been withdrawn from the assembled line the type is left on the type rails in a justified condition and is then seized by the line carriage actuated by the low speed mechanism, started by the reverse motion of the hand lever 192$^a$. The link 191 is fitted with an elongated slot 197 through which passes the shoulder screw 198 connecting the link to the crank 192. On the reverse movement of the hand lever 192$^a$ the justifying slide 190 and link 191 return by gravity to their normal position, and the hand lever 192$^a$ starts the low speed mechanism, the elongated slot 197 permitting the movement of the crank 192 and hand lever for that purpose without interfering with the position of the link 191 and justifying slide 190.

*Line carriage and actuating mechanism.* (See Figs. 1, 3, 4, 29, 33, 34, 35, 39, 40 and 50.)—Formed longitudinally in the top of the type assembling frame 167 are two dove tail grooves 199 in which are contained longitudinally movable dove tail slides 200. Connected to the top of the dove tail slides 200 are the bottom plates 201 of the line carriage, having between them the type guide rails 112 and formed along the top of the inner edges of the bottom plates 201 are rabbets forming the lower clamping jaws 203 against which rest the ends of the type 154. Formed parallel with the outer edges of the bottom plates 201 are longitudinal grooves 204 having inclined bottoms 205 and contained in the grooves 204 are adjustable tapering rocker bars 206 the ends of which are screw threaded and fitted with adjusting nuts 207. Projecting upwardly from the top of the bottom plates 201 are lugs 208 and formed in the top of the bottom plates 201 are sockets 209 for the expanding springs 210. Mounted on the bottom plates 201 are the top plates 211 having in their under faces grooves 212 to contain the upper parts of the adjustable tapering rocker bars 206. The arrangement of the grooves 204 and 205 and the adjustable tapering rocker bars 206 permits of the vertical adjustment of the top plates 211 to the bottom plates 201 to compensate for the variation in the size of the type which the machine from time to time will be required to produce. The top plates 211 are provided with slots through which pass the lugs 208 and journaled in the lugs 208 above the top plates 211 are compressing cams 214 to engage the top plates 211 and compress them against the bottom plates 201. When freed from the compressing action of the cams 214 the top plates 211 are raised from contact with the bottom plates 201 by the expanding springs 210. When the line of type has been justified and the word spacers and slide withdrawn therefrom the cams 214 are actuated to compress the top plate 211 towards the bottom plate 201 and these plates are caused to rigidly seize the justified line of type and hold it in its justified condition until after the locking strip has been impressed into the alining grooves. The compressing cams 214 are fitted with lugs 215 which register in the transverse grooves 216 of the locking slide 217. When the locking slide 217 is moved in the direction indicated by arrow in Fig. 29, it actuates the compressing cams 214 to press the top plate 211 towards the bottom plate 201, causing the plates to seize the line in the justified condition in which it was left on the withdrawal of the word spacers 159. The line carriage when locked by the compressing cams is moved from the position shown in Fig. 34 to the position shown in Fig. 39, bringing the top face of the type 154 into engagement with the anvil 223; the alining grooves 154ᵃ of the type 154 being opposite the top of the hammer 218 moving in the raceway 168. At this point the lugs 215 of the compressing cams 214 enter the grooves 219 of the unlocking slide 220 which has been moved into position to receive the lugs coincident with the movement of the locking slide 217 to compress the cams. The locking and unlocking slides 217 and 220 respectively move horizontally in guides 221 and 221ᵃ in the top plate 222 of the type assembling frame 167. Depending from the top plate 222 is the anvil 223, opposed to the top of the raceway 168 and moving vertically in the raceway 168 is the hammer 218, the top of which is opposed to the bottom of the anvil. The bottom of the anvil 223 corresponds in width to the width of the space between the top plates 211 and is located therein to form a positive contact with the top faces of the type, when the line carriage has been moved to bring the type into position above the hammer 218.

Formed in the end of the anvil 223 are vertical guides 224 in which moves a gravity dog 225. The type 154 as the line carriage moves in the direction of the anvil 223 raises the gravity dog 225, which, as soon as the line carriage has moved into position below the anvil descends and engages the end of the line to prevent the line carriage carrying it back to the point of assembly. Connected to the line carriage and moving therewith is a line carrying plate 226 having a shoulder 227 which when the line carrying plates 226 is in its normal position is opposed to the gravity dog 225. The gravity dog 225 holds the justified and locked line of type stationary below the anvil as the line carriage moves back to its normal position. The line carriage as it moves away from the anvil draws the line carrying plate 226 beneath the justified and locked line to enable the line carrying plate on the next operation of the line carriage moving it to a point immediately in rear of the galley, the shoulder 227 of the type carrying plate engaging the adjacent end of the line and causing its united movement with the type carrying plate 226. The type assembling frame 167 is reinforced by a casting 229 above the top and at the sides of the anvil to enable the anvil to resist the pressure of the hammer 218 when impressing the locking and justifying strip into the alining grooves of the type 154. Pivoted to the type assembling frame at the point where the type is ejected by the ejector to the type rails is a knife 228 which, as the type ejector slide 115 delivers the type from the mold to the type rails trims off the gate left in the casting. To prevent the displacement of the type 154 from the type rails 112 after delivery from the mold the top plate 222 is fitted with two depending guard plates 230 the lower ends of which are opposed to the type on the guide rails 112 at a distance therefrom equal to the depth of the type 154; and pivoted to the inner faces of the guard plates 230 are gravity dogs 231 to maintain the type on the type rails 112 beyond the point of delivery. The type as it is delivered from the mold by the ejecting slide moves the line assembling carriage and the previously delivered type and word spacers, space by space, until the line has been filled. During the delivery of the type by the ejecting slide from the mold to the type rails the top and bottom plates of the line carriage are separated by the expanding springs to allow of the type passing freely into the spaces between them. When the line has been filled and justified the line carriage is locked and moved to the anvil where the lead strip is pressed into the alining grooves of the type and into the word spaces of the justified line. After the locking strip has been impressed into the alining grooves and word spaces the line carriage returns to its normal position to receive the line then assembling on the line assembling carriage, the return of the line carriage causing the line carrying plate 226 to pass below and receive the line which has just been removed from the line carriage.

*Lead strip casting mechanism.* (See Figs. 1, 2, 3, 4, 39, 44, 45, 46, 47, 48 and 49.)— Contiguous to the type assembling frame 167 is the lead strip mold 232 having a mold cavity 233, the outer end of which is opposed to the spout of the lead strip metal pot 234. In the lead strip metal pot 234 is a well 235 having a supply port 237 communicating with the body of the lead strip metal pot and a spout 238 to conduct the metal from the well to the mold cavity. Working in the well 235 is a plunger 239 operated by a spring tensioned lever 240. Connected to the side face of the spring tensioned lever 240 is a bearing block 241 fitted with a stud 242 on which is mounted a roller 243 projecting slightly below the plane of the bottom face of the bearing block 241. The roller 243 travels on the face of the cam 244, in which is formed a depression 245 having an abrupt face 246 at one end thereof. When the depression 245, during the rotation of the cam 244 arrives opposite the roller 243 the roller drops into it and the bearing block 241 comes into contact with the face of the cam 244 and remains in contact therewith until the abrupt face 246 of the depression 245 has passed the end of the bearing block. The bearing block and roller then enter the depression and permit the tension spring 247 to draw the lever 240 and plunger 239 quickly downward, to force a sufficient flow of metal from the well 235 through the spout 238 to fill the mold cavity 233, the metal in the well 235 being replenished from the body of the type metal pot as it is from time to time pressed out by the plunger 239, the metal flowing from the body of the metal pot into the well through the supply port 237. Located below the bottom of the metal pot 234 is a heater 251 and surrounding the lead strip metal pot 234 is a heat confining jacket 248 fitted with a removable lid 249, having an outlet 250 for the escape of the gases, the object of the heat confining jacket being to economize the heat and to maintain all parts of the type metal pot at practically the same temperature.

*Lead strip molding mechanism.* (See Figs. 1, 29, 35, 39, 41, 43, 44, 45, 46, 47, 48 and 49.)— The lead strip mold 232 is mounted on the top of the main frame 14 in juxtaposition to the spout of the lead strip metal pot. Overhanging the mold 232, when in its normal position, is a rigid bracket 252 the ends of which are fastened to the top of the main frame 14. To facilitate the removal of the lead strip from the mold, the mold is made in two separable sections 253 and 254 respectively, the back mold section 254 having a limited movement in the bracket 252. The front mold section 253 has a forwardly projecting base 255 fastened to the top of the reciprocating slide 256 moving in slide ways 257 by the actuating lever 258. In the rear face of the front mold section 253 is a semi-circular recess 259 in which registers the semi-circular core 260, forming part of the front face of the back mold section 254. The semi-circular recess 259 and the semi-circular core 260 form a mold cavity 233, the ingate of which is opposed to the spout 238. Formed in the top of the bracket 252 are elongated slots 261 in which move the stops 262 of the back mold section 254. During the ejection of the type metal from the type metal pot to the mold cavity the back face of the back mold section is in contact with the front face of the spout 238 and remains in contact therewith while the type metal is being forced into the mold cavity 233. When the plunger 239 has completed the ejection of the metal from the well 235 the actuating lever 258 operates to move the mold from the spout 238 to prevent the heat of the lead strip metal pot being imparted to the mold. The lower end of the actuating lever 258 is mounted on a rock shaft 270 journaled in a bracket 271 connected to the main frame 14 and the upper end of the actuating lever 258 is connected to the bottom of the slide 256 of the front mold section 253.

Mounted on the rock shaft 270 is a crank 272 and connected to the crank 272 is one end of a link 273, the opposite end of which is connected to a lever 274 having a pin 275 working in the groove 276 of the cam 244. The cam 244 is mounted on the low speed shaft 277, started, stopped and driven as hereinafter described. When the cavity 233 of the mold 232 has been filled with type metal from the type metal pot, the cam 244 actuates the lever 258 to move the front mold section 253 and slide 256 forward in the slide way 257, the forward movement of the front mold section 253 carrying with it by frictional contact the back mold section 254 until the movement of the back mold section 254 is arrested by the stops 262 coming into contact with the front ends of the elongated slots 261. After the stoppage of the back mold section 254 the movement of the front mold section 253 is continued by the actuating lever 258 until it has cleared the front of the bracket sufficiently to allow of the movement of the trimming knife 263 between its rear face and the front face of the bracket 252 and at this point it is held stationary, during the forward movement of the trimming knife 263. The trimming knife 263 is rigidly secured to the reciprocating knife bar 266 fastened to the lug 267 forming part of the bottom plate 201 of the line carriage and moving therewith, the trimming knife being guided in its movements by a bracket 268 projecting upwardly from and forming part of the main frame 14. When the front mold section 253 has cleared the bracket 252 sufficiently to allow of the movement between itself and the bracket of the trimming knife 263 it is held stationary and the line carriage moves into position between the anvil and the hammer. This movement of the line carriage moves the trimming knife 263 across the rear face of the front mold section to cut the gate 264 from the lead strip 265. When the trimming knife has passed across the rear face of the front mold section the actuating lever 258 continues the movement of the front mold section outward to its full extent from the bracket 252 where it is again held stationary during the return movement of the line carriage. Connected to the reciprocating knife bar 266 is the lead strip ejector 269 which, on the return movement of the reciprocating knife bar 266 with the line carriage to its normal position, enters the mold cavity 233 and ejects or displaces the lead strip 265 longitudinally from the mold cavity and deposits it on the hammer 218. When the ejector and trimming knife have returned to their normal position the actuating lever 258 moves the mold section 253 towards the mold section 254 to assemble the mold sections and then move them against the front face of the spout of the lead strip metal pot on the next operation of the machine. In the cam 244 is a cam groove 278 in which moves the roller 279 of the lever 280 fulcrumed on a stud 282 forming part of the main frame 14 and upon which it is oscillated during the revolution of the cam 244. The front end 284 of the lever 280 is forked and loosely embraces the block 283 rigidly connected to the reciprocating knife bar 266 and compensates for the curved movement of the lever when oscillating on its fulcrum stud 282. The oscillation of the lever 280 during the revolution of the cam 244 moves the reciprocating knife bar 266 and line carriage 281 back and forth in a fixed path across the top of the type assembling frame 167. As the line carriage 281 is moved into position to receive the justified line from the line assembling carriage the lead strip ejector displaces the lead strip 265 from the lead strip mold and deposits it on the hammer 218. During the pause between the positioning of the line carriage to receive the justified type from the auxiliary line carriage and the next movement of the line carriage to the anvil the front mold section 253 is moved by the actuating lever 258 to the back mold section 254 and the assembled mold is then moved into contact with the spout 238 of the lead strip metal pot to have the mold cavity again filled with type metal from the lead strip metal pot. After the casting of the lead strip the mold is moved away from the spout and the mold sections are separated, the front mold section being positioned to have the gate cut from the lead strip by the trimming knife during the movement of the line carriage to the anvil on the next operation of the low speed mechanism.

Connected to the locking slide 217 and to the unlocking slide 220 is the forked end 285 of the lever 286 actuated by a cam 287 mounted on the low speed shaft 277. The rotation of the low speed shaft 277 causes the cam 287 to move the slides 217 and 220 in the direction indicated by arrow in Fig. 1, causing the locking slide 217 to lock the compressing cams 214 against the top plates 211 of the line carriage preparatory to the movement of the line carriage to the anvil and hammer, the unlocking slide 220 being moved into position to enable the slide grooves to receive the lugs of the compressing cams when the line carriage has been moved into position below the anvil. After the lead strip has been pressed into the alined grooves of the type the cam 287 actuates the lever 286 to move the locking and unlocking slides in the reverse direction to enable the slide 220 to unlock the compressing cams and relieve the top plates of the line carriage of the pressure thereof.

*The hammer operating mechanism.* (See Figs. 39, 41, 42 and 50.)—Connected to the bottom of the main frame 14 is a bracket upon which is loosely supported the bearing plate 289 and interposed between the bracket 288 and the bearing plate 289 is an adjusting wedge 290 operated by the adjusting screw 291. In the lower part of the hammer 218 is an elongated vertical slot 292 having at its lower end a tie piece 293. Connected to the bearing plate 289 and to the hammer 218 at the top of the vertical slot 292 are the arms 294 and 295 respectively which form a toggle-jointed lever to force the hammer 218 in the direction of the anvil 223. Connected to the toggle-jointed lever is one end of a link 296, the opposite end of which is connected to a lever 297, actuated by a cam 298 mounted on the low speed shaft 277, the lever 297 being fulcrumed to a bracket 299 connected to the main frame 14 in rear of the lead strip metal pot. The forward movement of the link 296 expands the arms 294 to force the hammer 218 in the direction of the anvil 223. This movement of the hammer places the lead strip 265 in the alined groove of the type and flattens it out to completely fill the same. The face of the hammer 218 is provided with inclined projections 300 as shown in Fig. 50, to form the longitudinal grooves 301 in the outer face of the lead strip 265 and parallel with the edges thereof. The inclined projections 300 in addition to forming the grooves 301 in the outer face of the lead strip 265 press the lead strip into the word spaces of the justified line to form the protuberances 302 to hold the type in its word spaced and justified condition. The movement of the link 296 to expand the arms 294 and 295 of the toggle-jointed lever raises these arms into a substantially vertical position, the side faces of the arms being practically in the same vertical plane. The expanding movement of the arms 294 and 295 raises the hammer 218 and tie piece 293, the tie piece being so arranged that when the hammer is raised to its full limit the tie piece is positioned opposite the pivot 303 of the arms 294 and 295 to prevent the arms passing beyond a vertical position. By preventing the arms passing beyond a vertical position the link 296 and lever 297 are able to return them to the position shown in Fig. 39, when lowering the hammer for the next operation of the machine.

*Galley and galley operating mechanism.* (See Figs. 1, 3, 13, 39, 44, 51, 52 and 52ª.)— The galley 306 is fitted with a rigid back 304 having slots 305 to receive the galley holding screws 307 which detachably hold the galley to the front of the main frame 14 at the remote end of the type assembling frame 167. Formed in the inner faces of the galley sides 306ª are vertical slide ways 309 for the vertically movable galley bottom 310. The galley bottom 310 is provided with a longitudinal bore 310ª in which is contained a tension spring 312 to force the friction bolts 311 into the slide ways 309, the tension of the spring 312 causing the friction bolts 311 to engage the slide ways 309 with sufficient frictional contact to support the galley bottom and the composed line or lines of type contained in the galley 306. Connected to the main frame 14 at the sides of the galley 306 are vertical bearings 313 through which move vertical tierods 314 connected to the plunger 315 above the top of the galley, and to a yoke 316 below the bottom of the galley. The under side of the yoke 316 is fitted with a lug 316ª and connected to the lug 316ª and to the lug 317 forming part of the actuating lever 258 is a rocking link 318 (Fig. 51) by means of which a vertical reciprocating movement is imparted to the yoke during the movement of the actuating lever 258 and from the yoke to the plunger 315 by means of the tierods 214. The descending movement of the plunger 315 presses the line of type as it is delivered to the galley downward in the direction of the galley slide 310 forcing the galley slide and its contents downward in the slide ways a distance equal to the thickness of the delivered line of type. By reference to Fig. 51 it will be seen that the top of the galley sides 306ª are fitted with trimming knives 319 to the top of which the line of type is delivered from the type carrying plate 226. The descending movement of the plunger 315 forces the line of type past the trimming knives 319 and enables them to cut the lead strip flush with the ends of the type, the knives being beveled to allow the trimmings falling on the outside of the galley. Connected with the main frame 14 is arm 320 having at its lower end an elongated slot 321, through which passes the fulcrum pin 322 of the rocking link 318. By jointing the rocking link 318 as shown in Fig. 52ª, and having it fulcrumed to the arm 320 the actuating lever 258 can impart through the link 318 a vertical reciprocating motion to the yoke 316 and by providing the arm 320 with the elongated horizontal stop 321 for the fulcrum pin 322 the difference between the motion of the actuating lever 258 and yoke 316 is compensated for. Connected to the upper end of the lever 272 is the line ejector lever 327, the lower end of which is fitted with adjustable set screws 328 to regulate the length of the stroke of the upper end of the line ejector lever 327, actuating the line ejector plate 329. The line ejector plate 329 is fitted with a dove tail slide 329ª moving in a dove tail guide 330 formed in the bracket 268. During the operation of the machine the line carrying plate 226 is brought into position in rear of the galley frame 304, the top of the line carrying plate being in the same plane as the top of the trimming knives 319. The forward movement of the lever 272 causes the line ejector lever 327 to move the line ejector plate 329 forward for the purpose of delivering the line of type from the line carrying plate 226 to the top of the knives 319. When the line of type is deposited on the knives 319 the line ejector plate 329 returns to its normal position and the actuating lever 258 moves the link 318 to lower the plunger and press the line of type past the trimming knives 319 into the galley. The pressing of the line of type into the galley lowers the galley bottom a distance equal to the thickness of the line of type just pressed in. The return movement of the rock shaft 270 enables the actuating lever 258 to raise the yoke and plunger, and the lever 272 to return the ejector lever 327 and line ejector plate 329 to their normal positions.

*The reservoir type metal pot.* (See Figs. 1, 2, 29 and 55.)—In rear of the type metal pot 49 is a reservoir type metal pot 331 having a well 332 in which moves a vertical plunger 333 connected to the spring tensioned lever 334 fulcrumed to a bracket 335 forming part of the rear of the main frame 14. The spring tensioned lever 334 has a roller 336 and block 337 against which moves the face of the cam 338 mounted on the low speed shaft 277, the construction of the cam, roller, block, spring tensioned lever and plunger just described being similar to those shown in Figs. 47, 48 and 49 and described in connection with the lead strip metal pot. After the casting of each line of type the type metal pot 49 is replenished from the reservoir type metal pot 331 by the plunger 333 ejecting the type metal from the well 332 through the spout 339 to the type metal pot 49. Connecting the type metal pot 49 and the reservoir type metal pot 331 is an overflow pipe 340 to enable the surplus metal in the type metal pot 49 to flow back into the reservoir type metal pot 331. By means of the reservoir type metal pot the type metal in the type metal pot can be maintained at a constant level to replenish the type metal in the wells as it is forced out by the spring tensioned plungers to the mold cavities.

*Low speed starting and stopping mechanism.* (See Figs. 1, 2, 54, 56, and 57.)—Connected to the low speed starting and stopping shaft is a crank 341 having a pin 342 working in an elongated slot 343 in the low speed controlling link 344. Pivotally connected to the low speed controlling link 344 is the forked end 345 of the low speed starting and stopping lever 346 fulcrumed to a rock shaft 347. The low speed starting and stopping lever 346 is fitted with a cam 348 which engages the stop 349 on the inner face of the rim of the spur wheel 350 rigidly mounted on the low speed shaft 277. The rock shaft 347 is journaled in bearings 351 connected to the main frame 14 and actuated by the rock shaft 347 is a clutch lever 352. Movably mounted on the clutch shaft 353 and revoluble therewith is a clutch member 354 connected to the forked end 355 of the clutch lever 352, by means of which it is moved longitudinally on the clutch shaft 353 by the rocking motion of the shaft 347. Loosely mounted on the clutch shaft 353 is a sprocket wheel 356 having a clutch member 357 adapted to be engaged by the clutch member 354 when the clutch member 354 has been moved into engagement with it. Meshing with the spur wheel 350 is a pinion wheel 358 mounted on a stud 359 connected to the main frame 14. Integrally formed with the pinion wheel 358 is the hub 360 of the sprocket wheel 361 around which and the sprocket wheel 356 passes the sprocket chain 362. Mounted on the clutch shaft 353 is a spur wheel 363 meshing with the pinion wheel 364 mounted on the high speed shaft 43. The pinion wheel 364 forms part of or is rigidly connected to the hub of the driving pulley 44 so that the continuous revolution of the driving pulley and the pinion wheel will cause the continuous revolution of the clutch shaft 353.

Connected to the bracket 365 at the back of the key board frame 9 is a spring tensioned swinging lever 366 having an inclined shoulder or cam 367 and connected to the crank 192 is a pin 368 riding on the inclined shoulder or cam 367. Connected to the lower end of the swinging lever 366 and to a lug 370 forming part of the hub 371 of the crank 192 is a tension spring 369 by which the swinging lever 366 is returned to its normal position after each operation of the hand lever 192$^a$. During the movement of the hand lever 192$^a$ towards the front of the key board frame 9 the crank 192 actuates the justifying mechanism to force the word spacers into the assembled line to properly justify it. During this movement of the hand lever 192$^a$ and crank 192 the spring 369 performs no function. When the justifying mechanism has completed the justification of the line the hand lever 192$^a$ is reversed and carried beyond its normal position to the stop 372 to actuate the controlling link 344 and start the low speed mechanism. At this point the hand lever is released and is returned to its normal position by the swinging lever 366, under the influence of the tension spring 369, engaging the pin 368, the pin 368 riding on the inclined shoulder or cam 367 until the normal or neutral positions of the swinging and hand levers are attained. By the elongated horizontal slot 343 and pin 342 the justifying mechanism is actuated before the low speed motion is brought in action. Connected to the hand lever 192$^a$ is an emergency lever 373 which in its normal position engages the stop 372 to limit the movement of the hand lever 192$^a$ in the direction indicated by arrow in Figs. 2 and 54, the emergency lever 373 coming into contact with the stop 372. When it is desired to stop the low speed motion at any part of its revolution, the emergency lever 373 is actuated to allow the hand lever 192$^a$ to move to the full limit of the guide 374 and actuate the controlling link 344 to bring the emergency cam 375 into engagement with the clutch lever 352 and actuate it to disengage the clutch member 354 from the clutch member 357 of the sprocket wheel 356. The displacement of the clutch members stops the revolution of the sprocket wheel 376, the stoppage of which causes the stoppage of the low speed shaft and intermediate parts.

*The hammer.* (See Fig. 50.)—In the top of the hammer 218 are vertical slots 400 and passing through the slots 400 are pins 401 holding the movable sides 402 to the hammer. Connected to the hammer 218 below the slots 400 is a ledge 403 and mounted upon the ledge 403 is a spring 404 bearing against the bottom of the movable sides 402. The movable sides 402 hold the lead strip on the top of the hammer until the hammer impresses it into the alining grooves of the type. During the upward movement of the hammer the top of the sides 402 come in contact with the bottom of the line carriage, the line carriage arresting the movement of the plates and the slots 400, permitting the continued movement of the hammer until it has impressed the locking strip into the alining grooves.

Having thus fully described my invention, what I claim as new and desire to secure by Letters Patent is;—

1. In a type casting machine the combination of a mechanism for producing and assembling in individual and sequential order a series of type units having alining grooves, and a mechanism coacting therewith for producing a locking strip and means for impressing it into the alining grooves of the type units.

2. In a type casting machine the combination of a means for producing in individual and sequential order a series of type units with alining grooves, means for assembling the type units into word spaced and justified lines, and means coacting therewith for producing a locking strip and means for impressing it into the alining grooves of the type units.

3. In a type casting machine the combination of a means for producing in individual and sequential order a series of type units with alining grooves, means for assembling the type units into word spaced lines, means for justifying the assembled and word spaced type units, means coacting therewith for producing a locking strip, and means for impressing the locking strip into the alining grooves of the type units and word spaces of the justified line.

4. In a type casting machine the combination of a mechanism for producing in individual and sequential order a series of type units, means for ejecting the type units from the type producing mechanism, means for collecting the ejected type units and assembling them into word spaced lines, and means for producing a locking strip and means for impressing it into the alining grooves and word spaces of the line.

5. In a type casting machine the combination of a mechanism for producing in individual and sequential order a series of type units, means for ejecting the type units from the type producing mechanism, means for collecting the ejected type units and assembling them into word spaced lines, and means for producing a locking strip and means for impressing it into the alining grooves and word spaces of the word spaced line.

6. In a type casting machine the combination of a mechanism for producing in individual and sequential order a series of type units, means for ejecting the type units from the type producing mechanism, means for collecting the ejected type units and assembling them into word spaced lines, means for justifying the word spaced lines, means co-acting therewith for producing locking strips and means for impressing the locking strips into the alining grooves and word spaces of the justified lines.

7. In a type casting machine the combination of the means to produce the type in individual and sequential order and to form in the type a groove to receive the locking strip, means to assemble the type into word spaced and justified lines, and means to produce a locking strip and means to impress it into the grooves to hold the type in its word spaced and justified condition.

8. In a type casting machine the combination of a means to produce the type in individual and sequential order and form in the type intermediate its ends a groove to receive a locking and justifying strip and means to impress the locking and justifying strip therein.

9. In a type casting machine, a mold consisting of separable sections, one section having a type cavity and a groove communicating therewith, and the other section having a core to enter said groove and type cavity.

10. In a type casting machine, a mold consisting of separable sections, one of the sections having a series of type cavities and a longitudinal groove communicating therewith, the other section having a dove tailed core to enter the groove and type cavities and form in the type units dove tailed grooves.

11. In a type casting machine, a mold consisting of separable sections, one of the sections having a dove tailed core and the other section consisting of separable sub sections having therein a type cavity and a groove communicating therewith to receive the core of the other section.

12. In a type casting machine, the combination of a mold consisting of separable sections, one of such sections having a dove tailed core and the other section consisting of two separable sub sections having therein a series of type cavities and a groove communicating therewith, and means to assemble and separate the mold sections and sub sections.

13. In a type casting machine a mold having a drag fitted with a dove tail core and a cope movable therefrom, consisting of laterally separable sections having a dove tail groove to receive the dove tail core, and a series of mold cavities communicating therewith.

14. In a type casting machine a mold having a drag fitted with a dove tail core and a cope movable therefrom consisting of laterally separable sections having a dove tail groove to receive the dove tail core and a series of mold cavities communicating therewith, means to laterally separate the cope sections, and means to vertically separate the cope from the drag.

15. In a mold for a type casting machine the combination of the drag having water ways therein, a core for the drag, a cope separable from the drag consisting of laterally separable sections having a groove to receive the dove tail core and type cavities communicating therewith, means to laterally separate the cope sections and means to separate the cope from the drag.

16. In a mold for type casting machines the combination of a laterally movable drag having waterways therein, a core for the drag, means for moving the drag laterally, a cope consisting of laterally separable sections having a groove to receive the core and type metal cavities communicating therewith, means to laterally separate the cope sections and means to vertically separate the cope from the drag.

17. In a mold for type casting machines the combination of a cope consisting of two separable sections having a series of type cavities therein, and a longitudinal groove communicating therewith, and a water chambered drag having a core to enter the groove and cavities.

18. In a type casting machine the combination of a matrix bar movable in a fixed path, a matrix bar supporting dog normally upholding the matrix bar, a key rod, a matrix bar releasing slide actuated by the key rod, a matrix bar return dog, normally engaged by a projection forming part of the matrix bar supporting dog and operated by the actuation thereof, and means for moving the matrix bar return dog to return the matrix bar to its normal position.

19. In a type casting machine the combination of a matrix bar movable in a fixed path, a matrix bar supporting dog to normally uphold the matrix bar, a key rod, a matrix bar releasing slide actuated by the key rod, a stopping plate, a stopping plate lever to interpose a stopping plate in the path of the released matrix bar, a rock shaft to actuate the stopping plate lever, operated by the key rod co-incident with the operation of the matrix bar releasing slide.

20. In a type casting machine the combination of a matrix bar movable in a fixed path, a matrix bar supporting dog normally upholding the matrix bar, a key rod, a matrix bar releasing slide actuated by the key rod, a matrix bar return dog normally engaged by a projection of the matrix bar supporting dog and actuated by the actuation thereof, means for actuating the matrix bar return dog to return the matrix bar to its normal position, a stopping plate adapted to be interposed in the path of the released matrix bar, a stopping plate lever to actuate the stopping plate, a rock shaft for the stopping plate lever actuated by the key rod co-incident with the actuation of the matrix bar releasing slide.

21. In a type casting machine the combination of the stopping plates, a stopping plate returner pivoted at one end and free at the other to engage the operated stopping plate, and means to oscillate the stopping plate returner to restore the operated stopping plate to its inoperative position.

22. In a type casting machine the combination of the stopping plates, a stopping plate return mechanism comprising a pivoted frame having a roller at its free end to engage the operated stopping plate and means for oscillating the pivoted frame to restore the operated stopping plate to its inoperative position.

23. In a type casting machine the combination of the matrix bar movable in a fixed path, a stopping plate, means to release the matrix bar and interpose a stopping plate in its path, an oscillating frame to return the stopping plate to its initial position and a reciprocating slide to return the matrix bar.

24. In a type casting machine the combination of a stopping plate adapted to be interposed in the path of the released matrix bar, and a stopping plate return mechanism consisting of a spring tensioned oscillating frame opposed to the stopping plate, and means to actuate the oscillating frame to return the stopping plate.

25. In a type casting machine the combination of a matrix bar movable in a fixed path, a stopping plate, means to release the matrix bar and interpose a stopping plate in its path, a stopping plate return mechanism, and a reciprocating slide to return the matrix bar.

26. In a type casting machine the combination of a matrix bar movable in a fixed path, a stopping plate, means to release the matrix bar and interpose a stopping plate in its path, the main shaft, the stopping plate return mechanism and a reciprocating slide to return the matrix bars actuated by the rotation of the main shaft.

27. In a type casting machine the combination of a stopping plate, a stopping plate return mechanism consisting of an oscillating frame opposed to the stopping plate, a spring tensioned lever arranged to actuate the oscillating plate to return the stopping plates to their initial position and a cam to actuate the lever.

28. In a type casting machine the combination of a stopping plate adapted to be interposed in the path of the released matrix bar, and a stopping plate return mechanism consisting of an oscillating frame opposed to the stopping plate, a downwardly directed lug for the oscillating frame, an actuating lever arranged to engage the downwardly projecting lug and means to actuate the lever.

29. In a type casting machine the combination of the high speed shaft, a driving pulley therefor, a high speed shaft starting slide actuated by the operation of a key rod, a supporting arm connected to the starting slide, a spring tensioned trip dog normally supported by the arm, a clutch member contained in the high speed shaft and in the hub of the driving pulley to cause the united rotation of the same.

30. In a type casting machine the combination of the matrix bars and mechanism for actuating the same an oscillatory type metal pot and an aliner for the matrix bar operatively connected with the type metal pot.

31. In a type casting machine the combination with the matrix bar and means for actuating the same, of a matrix bar alining slide movable in guides to position the character of the released matrix bar, a rock shaft, a crank rigidly mounted on the rock shaft and pivotally connected to the alining slide, a second crank connected to the rock shaft and to a spring tensioned compensating link actuated by the operating mechanism.

32. In a type casting machine the combination of the matrix bars and mechanism for actuating the same, an oscillatory type metal pot, and a matrix bar alining slide operatively connected with the type metal pot.

33. In a type casting machine, the combination with the matrix bars and means for actuating the same of a matrix bar alining slide movable in guides to engage the released matrix bar, a rock shaft, a crank rigidly mounted on the rock shaft and pivotally connected to the alining slide, a second crank connected to the rock shaft and to a spring tensioned compensating link, actuated by the operating mechanism, a matrix bar locking slide and means to actuate the matrix bar locking slide.

34. In a type casting machine the combination of the matrix bars, a mold having channels alining with said matrix bars, and an oscillatory type metal pot having a series of wells corresponding to the mold channels, and plungers for said wells corresponding to said matrix bars and means for actuating said plungers during the actuation of the matrix bars.

35. In a type casting machine the combination of the matrix bars, a mold having channels alining with said matrix bars, an oscillatory type metal pot having a series of wells corresponding to the mold channels, plungers for said wells corresponding to said matrix bars, means for actuating said plungers during the actuation of the matrix bars, and a matrix bar aliner operatively connected with said type metal pot.

36. In a type casting machine the combination of the matrix bars, mechanism to actuate the matrix bars, a type producing mechanism, a matrix bar alining slide, a rock shaft, a crank connected to the matrix bar alining slide and rock shaft, a second crank for the rock shaft and a compensating link connecting the second crank with the type producing mechanism.

37. In a type casting machine the combination of the matrix bars, mechanism to actuate the matrix bars, a type producing mechanism, a matrix bar alining slide, a rock shaft a crank connected to the matrix bar alining slide and rock shaft, a second crank connected to the rock shaft, a compensating link connecting the second crank with the type casting mechanism, a matrix bar locking slide, a lever to actuate the matrix bar locking slide, and machanism to actuate the lever.

38. In a type casting machine, the combination with the matrix bars and the matrix bar actuating mechanism, of a type metal pot having a well therein and a spout to conduct the type metal to the mold cavity, a plunger for the well, a lever connected to the plunger, a lever supporting arm normally upholding the lever arranged to be displaced by the matrix bars.

39. In a type casting machine the combination with the matrix bar and matrix bar actuating mechanism, of a type metal pot having a well therein and a spout to conduct the type metal to the mold cavities, a plunger for the well, a lever connected to the plunger, a lever supporting arm normally upholding the lever, and means to displace the lever supporting arm actuated by the release of the matrix bar.

40. In a type casting machine the combination of the type metal pot, a well within the type metal pot supplied from the crucible and having a spout arranged to communicate with the mold cavity, a plunger for the well, a spring tensioned lever for the plunger, a supporting arm connected to the spring tensioned lever, a matrix bar, a tripping plate supported by the matrix bar and adapted to descend with the same to displace the supporting arm and allow of the descent of the spring tensioned lever and plunger.

41. In a type casting machine the combination of the type metal pot having a well therein communicating with the crucible and fitted with a spout, a plunger for the well, a spring tensioned lever connected to the plunger, a pivoted supporting arm upholding the lever, a matrix bar, a tripping plate movable with the matrix bar, and means to raise the spring tensioned lever and plunger after being actuated.

42. In a type casting machine the combination of the type metal pot having a well therein, communicating with the crucible and fitted with a spout, a plunger for the well, a spring tensioned lever connected to the plunger, a pivoted supporting arm upholding the lever, a matrix bar, a tripping plate, movable with the matrix bar, lifting rods and mechanism to actuate the lifting rods to restore the operated levers to their normal position, substantially as specified.

43. In a type casting machine the combination of a type metal pot, a type well therein communicating with the crucible and fitted with a spout, a cover for the type metal pot, a plunger for the well, a spring tensioned lever fulcrumed to the cover, a spring tensioned supporting arm pivotally connected to the lever and engaging the support forming part of the cover, a matrix bar and a tripping plate movable therewith to upset the supporting arm co-incident with the actuation of the matrix bar.

44. In a type casting machine the combination of the matrix bar, a type forming mold and an oscillating type metal pot co-acting with the type forming mold to produce the type in individual and sequential order and means for actuating the type metal pot co-incident with the actuation of the matrix bars.

45. In a type casting machine the combination of the matrix bars, a type forming mold, an oscillating type metal pot co-acting with the type forming mold to produce the type in individual and sequential order, means for releasing the matrix bars and means for actuating the type metal pot operated by the releasing means for the matrix bars.

46. In a type casting machine the combination of the matrix bars, the type forming mold, an oscillating type metal pot, a well therein fitted with a spout to communicate with the type cavity of the mold, a plunger for the well a spring tensioned lever for the plunger, a supporting arm connected to the spring tensioned plunger, and a tripping plate movable with the matrix bar.

47. In a type casting machine the combination of the matrix bars, the type forming mold, an oscillating type metal pot, a well therein fitted with a spout to communicate with the type cavity of the mold, a plunger for the well, a spring tensioned lever for the plunger, a supporting arm connected to the spring tensioned plunger, a tripping plate movable with the matrix bar, lifting rods to return the spring tensioned levers to their normal position after being actuated, and means to actuate the lifting rods.

48. In a type casting machine the combination of a type mold consisting of separable sections, one of which is provided with a series of type cavities and a groove communicating therewith, and the other section having a core to enter the groove and type cavities, a type ejector to remove the type from the core when the mold sections have separated and mechanism to actuate the type ejector.

49. In a type casting machine the combination of a type mold consisting of separable sections one of which is provided with a series of type cavities and a groove communicating therewith, and the other having a core to enter the groove and type cavities, a type ejecting slide, a lever to actuate the type ejecting slide to remove the type from the core when the mold sections have separated and mechanism to actuate the lever.

50. In a type casting machine the combination of the matrix bars movable in a fixed path, mechanism to support the matrix bars in their normal position and to release them individually, and a matrix bar return mechanism consisting of a vertically movable frame, matrix bar return dogs oscillatingly mounted in the frame, a rotatable shaft and spur wheels mounted on the shaft engaging the racks of the vertically movable frame.

51. In a type casting machine the combination of a series of matrix bars, means for supporting and releasing the matrix bars, a vertically movable matrix bar return frame, a shaft mounted in the matrix bar return frame, matrix bar return dogs oscillatingly mounted on the shaft, tension springs holding the supporting dogs in a normal position, a rotatable shaft and spur wheels mounted on the shaft engaging the racks of the matrix bar return frame.

52. In a type casting machine, a type assembling carriage consisting of longitudinally movable rails and a stopping head connected to the rails and moving therewith.

53. In a type casting machine, a type assembling carriage consisting of longitudinally movable rails, a head rigidly connected to the rails, a vertical guide for the head, and a spring tensioned slide moving vertically in the guide.

54. In a type casting machine, a type assembling carriage consisting of longitudinally movable rails, a head rigidly connected to the rails, a vertical guide for the head, a spring tensioned guide moving vertically in the guide, and a spring tensioned bolt to hold the slide in its normal position.

55. In a type casting machine, a type assembling carriage consisting of longitudinally movable rails, a head rigidly connected to the rails, a vertical guide in the head, a slide vertically movable therein, a horizontal chamber and a spring tensioned bolt longitudinally movable in the chamber to hold the slide in its normal position.

56. In a type casting machine, a type assembling carriage consisting of longitudinally movable rails, a head therefor, a vertical guide for the head, a slide vertically movable therein, a spring chamber within the head, a spring tensioned bolt therein, and a lifting spring to raise the slide therein.

57. In a type casting machine a type assembling carriage consisting of longitudinally movable rails, a head therefor, a vertical guide for the head, a slide vertically movable therein, a spring chamber within the head, a spring tensioned bolt therein, a slide-lifting spring connected to the head and contained in a vertical groove therein.

58. In a type casting machine, a word spacer consisting of a substantially wedge-shaped body, a spring tensioned pawl pivoted thereto and a latch at the lower end of the body portion.

59. In a type casting machine, a word spacer consisting of a substantially wedge-shaped body having at the top a rectangular projection to enter the assembling line, a spring tensioned pawl pivoted to the body portion and a latch at the lower end of the body portion.

60. In a type casting machine a line assembling carriage consisting of longitudinally movable rails, and a head rigidly connected thereto, in combination with a word spacer consisting of a substantially wedge-shaped body portion, a spring tensioned pawl pivoted thereto to engage the rails of the line assembling carriage.

61. In a type casting machine a line assembling carriage consisting of longitudinally movable rails, one of which has in its inner face a longitudinal groove, a stationary head for the rails, a vertical guide for the stationary head, a slide vertically movable therein having at its lower end a latch and in the side edges of its upper end notches registering with corresponding notches in the top of the guide, a spring to raise the slide into its normal position, and a spring tensioned locking bolt to hold it therein in combination with a word spacer consisting of a substantially wedge-shaped body portion, a spring tensioned pawl pivoted to the body portion adapted to enter the longitudinal groove in the rail of the line assembling carriage and a latch at the lower end of the body portion.

62. In a type casting machine the combination of a mechanism to produce the type in individual and sequential order, a type assembling mechanism to receive the type from the type producing mechanism, word spacers arranged to be inserted into the assembling line, a justifying mechanism to justify the assembled line and means to prevent the displacement of the word spacers until actuated by the justifying mechanism.

63. In a type casting machine the combination of a mechanism to produce the type in individual and sequential order a type assembling mechanism to receive the type from the type producing mechanism, word spacers arranged to be inserted into the assembling line, a justifying mechanism to justify the assembled line and withdraw the word spacers therefrom, and means for preventing the displacement of the word spacers until actuated by the justifying mechanism.

64. In a justifying mechanism for a type casting machine, the combination of a movable justifying slide, an actuating mechanism therefor and a spring actuated pawl carried by the movable justifying slide.

65. In a justifying mechanism for a type casting machine the combination of a movable justifying slide, an actuating mechanism therefor, a pawl stop for the movable justifying slide and a spring tensioned rocking pawl, fulcrumed to the movable justifying slide.

66. In a justifying mechanism for a type casting machine the combination of a movable justifying slide, an actuating mechanism therefor, a pawl stop, a rocking pawl fulcrumed to the movable justifying slide in juxtaposition to the pawl stop and a tension spring to hold the rocking pawl in its normal position.

67. In a justifying mechanism for a type casting machine the combination of a movable slide, a link hinged thereto having an elongated slot therein and an actuating lever connected to the link by a pin passing through the elongated slot, a low speed starting shaft to actuate the lever and a hand lever for actuating the low speed starting shaft.

68. In a justifying mechanism for a type casting machine, the combination of a movable slide, a link hinged thereto, having an elongated slot therein and an actuating lever connected to the link by a pin passing through the elongated slot.

69. In a type casting machine the combination of a mechanism to produce the type in individual and sequential order, a type assembling mechanism to receive the type from the type producing mechanism, a word spacer box, a word spacer ejector for moving the word spacers into the assembling line, a word spacer key and a link connecting the word spacer key with the word spacer ejector.

70. In a type casting machine the combination of a mechanism to produce the type in individual and sequential order, a type assembling mechanism to receive the type from the type producing mechanism, a word spacer box, a spring tensioned pawl to regulate the delivery of the word spacers therefrom, a word spacer ejector, a word spacer key and a link connecting the word spacer key and the word spacer ejector.

71. In a type casting machine the combination of a mechanism to produce the type in individual and sequential order, a type assembling mechanism to receive the type from the type producing mechanism, a word spacer box, a word spacer ejector therefor, a spring tensioned follower for the word spacer box to move the word spacers towards the ejector, spring tensioned pawls to regulate the delivery of the word spacers from the word spacer box, a word spacer key and a link connecting the word spacer key and ejector.

72. In a type casting machine, the combination of a mechanism to produce the type in individual and sequential order, a type assembling mechanism to receive the type from the type producing mechanism, the word spacer box, a word spacer ejector therefor, a spring tensioned follower for the word spacer box to move the word spacers towards the ejector, spring tensioned pawls to regulate the delivery of the word spacers from the word spacer box, a word spacer key, a link connecting the word spacer key and ejector, and a stop for the word spacer box to prevent the vertical displacement of the word spacers between the ejector and the follower.

73. In a type casting machine, the combination of a type assembling carriage consisting of longitudinally movable rails, a head rigidly connected thereto, a vertical guide for the head having grooves in its side edges, a slide vertically movable in the guide having notches to register with the grooves, pawl holding flanges for the slide, and retaining pawls to engage the flanges and hold the line assembling carriage during the justification of the assembled line.

74. In a type casting machine the combination of the matrix bar return frame, the racks thereon having at their upper ends outwardly projecting shoulders, a shaft passing through the frame, matrix bar return dogs oscillating thereon having inwardly directed heads, a tension spring connected to the matrix bar return frame bearing against the tails of the matrix bar return dogs to hold them in their normal position.

75. In a type casting machine the combination of the mechanism to produce the type in individual and sequential order, a line assembling carriage actuated by the delivery of the type from the type producing mechanism, a line carriage and means for actuating the line carriage to carry the assembled type from the line assembling carriage.

76. In a type casting machine, the combination of a line assembling carriage, a line carriage, mechanism to actuate the line carriage to seize the justified line and carry it from the line assembling carriage, and mechanism to impress the locking strip into the alining grooves of the justified line carried by the line carriage.

77. In a type casting machine, the combination of a line assembling carriage, a line carriage, mechanism to actuate the line carriage to seize the justified line and carry it to the lead strip pressing in mechanism.

78. In a type casting machine, the combination of a line assembling carriage, a line carriage, mechanism to actuate the line carriage to seize the justified line and carry it therefrom, means to impress the locking strip into the justified line, and means to actuate the line carriage to release the locked line.

79. In a line carriage for a type casting machine, the combination of a bottom plate, a top plate and means for compressing the top plate and bottom plate to seize the justified line from the line assembling carriage.

80. In a line carriage for a type casting machine, the combination of the bottom plates, the top plates, means for compressing the top and bottom plates to seize the justified line from the line assembling carriage, and means for expanding the plates when the compression has been released.

81. In a line assembling carriage for a type casting machine, the combination of the bottom plates, the top plates, expanding springs between the top and bottom plates to seize the justified line from the line assembling carriage.

82. In a line carriage for a type casting machine the combination of the bottom plates, the top plates, expanding springs interposed between the top and bottom plates, means for regulating the vertical adjustment of the top plates to the bottom plates, and means for compressing them to receive the justified line from the line assembling carriage.

83. In a type casting machine the combination of the bottom plates, the top plates, expanding springs interposed between the plates, adjustable tapering rocker bars for adjusting the top plates relatively to the bottom plates, expanding springs interposed between the plates and compressing cams for compressing the plates to receive the justified line from the line assembling carriage.

84. In a type assembling carriage for a type casting machine, the combination of the bottom plates having tapering grooves therein, vertical lugs, and rabbeted edges along their inner edges, in combination with the top plates having tapering grooves registering with the tapering grooves of the bottom plates, slots through which pass the vertical lugs, tapering rocker bars contained in the grooves and compressing cams journaled in the lugs to compress the top and bottom plates together.

85. In a line carriage for a type casting machine, the combination of the bottom plates, having rabbeted faces along their inner edges, vertical lugs, and tapering longitudinal grooves along the outer edges, the top plates having slots for the vertical lugs and tapering longitudinal grooves registering with the grooves of the bottom plate, tapering rocker bars contained in the grooves, means for longitudinally adjusting the rocker bars, compressing cams journaled in the lugs and means for imparting a reciprocating movement to the line carriage.

86. In a line carriage for a type casting machine, the combination of the bottom plates, having rabbeted faces along their inner edges, and vertical lugs, and tapering longitudinal grooves along the outer edges, the top plates having slots for the vertical lugs, and tapering longitudinal grooves registering with the grooves of the bottom plate, tapering rocker bars contained in the grooves, means for longitudinally adjusting the rocker bars, and compressing cams journaled in the lugs.

87. In a type casting machine, the combination of the type assembling frame, longitudinal grooves therein, a line carriage having longitudinal tenons contained in the longitudinal grooves, and means for imparting a reciprocating movement to the line carriage.

88. In a type casting machine the combination of a type assembling frame having a vertical raceway therein, laterally movable spring tensioned pawls located in the raceway to regulate the delivery of the word spacers, longitudinal grooves in a type assembling frame for the side rails of the line assembling carriage, and type guide rails mounted in the type assembling frame to receive the type as it is delivered from the type producing mechanism.

89. In a type casting machine, the combination of a type assembling frame having a vertical raceway therein, laterally movable spring tensioned pawls located in the raceway to regulate the delivery of the word spacers, longitudinal grooves in a type assembling frame for the side bars of the line assembling carriage, type guide rails mounted in the type assembling frame to receive the type as it is delivered from the type producing mechanism, and a trimming knife to remove the gate from the type as it is delivered to the type guide rails.

90. In a type casting machine, the combination of a type assembling frame having a vertical raceway therein, type guide rails mounted in the type assembling frame, guard plates, and gravity dogs for the guard plates to maintain the type on the type rails.

91. In a type casting machine the combination of the type assembling frame, a line carriage movable thereon, having compressing cams, locking and unlocking slides mounted in the type assembling frame to respectively lock and release the locking cams, and means to actuate the locking and unlocking slides.

92. In a type casting machine the combination of an anvil, a hammer opposed to the anvil and co-acting therewith, a line carriage, and an ejector for the anvil to deliver the type from the line carriage.

93. In a type casting machine, the combination of the type assembling frame, a line carriage movable thereon, and a type carrying plate connected to the line carriage and movable therewith.

94. In a type casting machine the combination of the type assembling frame having a raceway therein, a hammer movable in the raceway, and an anvil opposed to and co-acting with the hammer.

95. In a type casting machine the combination of a type assembling frame having a raceway therein, a hammer movable in the raceway, an anvil opposed to and co-acting with the hammer and means for actuating the hammer, substantially as specified.

96. In a type casting machine the combination of the type assembling frame having a raceway therein, a hammer movable in the raceway, an anvil opposed to and co-acting with the hammer, means for actuating the hammer, and a line carriage mounted on the assembling frame, reciprocating between the point of assembly and anvil.

97. In a type casting machine the combination of the type assembling frame having a raceway therein, a hammer movable in the raceway, an anvil opposed to and co-acting with the hammer, means for actuating the hammer, a line carriage mounted on the assembling frame reciprocating between the point of assembly and anvil, and a line carrying plate connected to the line carriage.

98. In a type casting machine the combination of the type assembling frame having a raceway therein, a hammer movable in the raceway, an anvil opposed to the hammer and co-acting therewith, a line ejector for the anvil, means for actuating the hammer, a line ejector for the anvil, and a line carriage mounted on the type assembling frame reciprocating between the point of assembly and the anvil and means for actuating the line carriage.

99. In a type casting machine the combination of the type assembling frame having a raceway therein, a hammer movable in the raceway, an anvil opposed to the hammer and co-acting therewith, a line ejector for the anvil, means for actuating the hammer, a line carriage mounted on the type assembling frame reciprocating between the point of assembly and the anvil and means for locking and unlocking the line carriage.

100. In a type casting machine the combination of the type assembling frame having a raceway therein, a hammer movable in the raceway, an anvil opposed to the hammer and co-acting therewith, a line ejector for the anvil, means for actuating the hammer, a line carriage mounted on the type assembling frame reciprocating between the point of assembly and the anvil, and a line carrying plate connected to the line carriage.

101. In a type casting machine the combination of the type assembling frame having a raceway therein, a hammer movable in the raceway, an anvil opposed to the hammer and co-acting therewith, a line ejector for the anvil, means for actuating the hammer, a line carriage mounted on the type assembling frame reciprocating between the point of assembly and the anvil, a line carrying plate connected to the line carriage, and means for locking and unlocking the line carriage.

102. In a type casting machine the combination of the ejector frame, longitudinal guides therein, an ejector slide longitudinally movable in the guides, a spring tensioned ejector lever to actuate the ejector slide, and means for actuating the ejector lever.

103. In a type casting machine the combination of the ejector frame, longitudinal guides therein, an ejector slide having a groove to receive the core of the type forming mold, a spring tensioned ejector lever to actuate the slide and means for actuating the lever.

104. In a type casting machine the combination of the stopping plate posts fitted with stopping plate combs, stopping plates contained in the combs having oblique slots, pins passing through the stopping plate posts and slots to limit the reciprocating motion of the stopping plates in an oblique direction, outwardly projecting lugs for the stopping plates, stopping plate levers in contact therewith, and means to actuate the stopping plate levers.

105. In a type casting machine the combination of the line assembling frame having a raceway therein, a hammer movable in the raceway having inclined projections on its operative face and an anvil opposed to the hammer.

106. In a type casting machine the combination of the line assembling frame having a raceway therein, a hammer movable in the raceway having inclined projections on its operative face, an anvil opposed to the hammer, a line carriage and means to actuate the hammer after the line carriage has come into position with the anvil.

107. In a type casting machine the combination of an anvil the line carriage and a reciprocating hammer.

108. In a type casting machine the combination of an anvil the line carriage and a reciprocating hammer having inclined projections on its operative face.

109. In a type casting machine, a hammer for impressing the lead strip into the alining grooves of the type, having inclined projections along its operative face.

110. In a type casting machine, a hammer having inclined projections on its face to form the longitudinal grooves and the word spacing projections in the locking strip, and means to actuate the hammer.

111. In a type casting machine the combination of the line carriage the hammer, a toggle-jointed lever for the hammer and means to actuate the toggle-jointed lever.

112. In a type casting machine, the combination of the line carriage a reciprocating hammer, a toggle-jointed lever for the reciprocating hammer and means for adjusting the hammer and toggle-jointed lever.

113. In a type casting machine, the combination of the line carriage a reciprocating hammer, an adjustable plate, a toggle-jointed lever fulcrumed to the hammer and plate, means for actuating the toggle-jointed lever and means for adjusting the plate relatively to the hammer.

114. In a type casting machine, the combination of the line carriage a reciprocating hammer, an adjustable plate, a toggle-jointed lever fulcrumed to the hammer and plate, means for adjusting the plate relatively to the hammer, means for actuating the toggle-jointed lever and means for preventing the toggle-jointed lever from passing the center line.

115. In a type casting machine, the combination of a reciprocating hammer, provided with an extension thereof, an elongated slot in the extension, a toggle-jointed lever, one arm of which is fulcrumed in the slot and the other end of which is fulcrumed to an adjustable plate, means for adjusting the plate relatively to the hammer, a stop for the hammer to prevent the toggle-jointed lever passing the center line, and means for actuating the toggle-jointed lever.

116. In a type casting machine the combination of a hammer and side plates, movably connected to the hammer.

117. In a type casting machine the combination of a hammer, vertically movable side plates for the hammer and a spring to hold the side plates relatively to the hammer head.

118. In a type casting machine the combination of a hammer, vertically movable side plates for the hammer, slots in the hammer head, a pin passing through the slots securing the side plates together and a spring to hold the side plates relatively to the hammer.

119. In a type casting machine the combination of the line assembling frame, a line carriage mounted thereon, a knife bar connected to the line carriage, a trimming knife carried by the knife bar and means for actuating the knife bar and line carriage.

120. In a type casting machine the combination of the line assembling frame, a knife bar connected thereto, a trimming knife carried by the knife bar, means for actuating the knife bar and line carriage and a lead strip ejector carried by the knife bar.

121. In a type casting machine the combination of the line assembling frame, a knife bar connected thereto, a trimming knife carried by the knife bar, a lead strip ejector carried by the knife bar and an actuating lever to move the line carriage and knife bar.

122. In a type casting machine the combination of the type producing and assembling mechanisms and the lead strip producing and impressing mechanism, substantially as specified.

123. In a type casting machine the combination of the type producing and assembling mechanisms, the lead strip metal pot, the lead strip mold and means for ejecting the lead from the lead strip mold and impressing it into the assembled type.

124. In a type casting machine, the combination of the lead strip metal pot, the lead strip mold and means for ejecting the lead strip from the lead strip mold and means for impressing it into the alining grooves of the assembled type.

125. In a type casting machine the combination of the type producing and assembling mechanism, the lead strip metal pot, the lead strip mold, a trimmer knife, a lead strip ejector, and means for impressing the lead strip into the assembled type.

126. In a type casting machine the combination of a mechanism to produce the type in individual and sequential order with alining grooves, a lead strip mold, and a lead strip metal pot and means to impress the lead strip into the alining grooves of the type.

127. In a type casting machine the combination of a mechanism to produce the type in individual and sequential order with alining grooves, a lead strip mold, a lead strip metal pot, and means to deliver the lead strip from the mold and means to impress it into the alining grooves of the type.

128. In a type casting machine the combination of a mechanism to produce the type in individual and sequential order with alining grooves, a lead strip mold, a lead strip metal pot, and means for trimming the gate from the lead strip, means for delivering the lead strip from the mold and means for impressing it into the alining grooves of the type.

129. In a type casting machine the combination of a mechanism to produce the type in individual and sequential order with alining grooves, a lead strip mold, and a lead strip metal pot, means for trimming the gate from the lead strip and means for delivering the lead strip from the mold and means for impressing it into the alining grooves of the type.

130. In a type casting machine the combination of a mechanism to produce and assemble the type in individual and sequential order with alining grooves, a lead strip mold having a type cavity therein, an ingate for the type cavity, a lead strip metal pot having a spout communicating with the ingate, a well within the lead strip metal pot, a plunger for the well and means for actuating the plunger, means for delivering the lead strip from the mold and means to impress the lead strip into the alining grooves of the type.

131. In a type casting machine the combination of a means for producing the type in individual and sequential order with alining grooves, a lead strip metal pot, a lead strip mold, and means for moving the lead strip mold into contact with and away from the lead strip metal pot, means for delivering the lead strip from the mold and means for impressing it into the alining grooves of the type.

132. In a type casting machine the combination of a means for producing type in individual and sequential order with alining grooves, a lead strip metal pot, a lead strip mold consisting of separable sections, means for delivering the lead strip from the mold and means for impressing it into the alining grooves of the type, and means for assembling and separating the sections.

133. In a type casting machine the combination of a means for producing type in individual and sequential order with alining grooves, a lead strip metal pot, a lead strip mold consisting of separable sections, means for assembling and separating the sections and means for moving the mold into contact with and away from the lead strip metal pot, means for delivering the lead strip from the mold and means for impressing it into the alining grooves of the type.

134. In a type casting machine, the combination of the lead strip metal pot, a mold movable therefrom, means for actuating the mold and separating the sections, a lead strip trimming knife, an ejector and means for actuating the lead strip trimming knife and ejector.

135. In a type casting machine, the combination of the lead strip metal pot, a mold movable therefrom consisting of separable sections forming between them a mold cavity, means to limit the movement of the mold section contiguous to the lead strip metal pot, and means to continue the movement of the other section to separate them.

136. In a type casting machine the combination of a means for producing the type in individual and sequential order with alining grooves, a lead strip metal pot, a lead strip mold consisting of separable sections, means for assembling and separating the sections and means to limit the movement of one of the separable mold sections, means for delivering the lead strip from the mold and means for impressing it into the alining grooves of the type.

137. In a type casting machine the combination of the type metal pot and a lead strip mold movable to and away from the type metal pot consisting of two separable sections, means to move the sections unitedly away from the type metal pot, a stop to limit the movement of one of the mold sections while the moving mechanism separates the other from it.

138. In a type casting machine the combination of the type metal pot, and a lead strip mold movable to and away from the type metal pot, consisting of two separable sections, means to move the sections unitedly away from the type metal pot, a stop to limit the movement of one of the mold sections while the moving mechanism separates the other from it, and an ejector to deliver the lead strip from the mold when the sections have been separated.

139. In a type casting machine the combination of a bracket having elongated slots therein, a back mold section having stops contained in the slots to limit its movement, a core for the back mold section, a front mold section having a curved recess to receive the core and form the mold cavity, a slide way for the front mold section, a lever connected to the front mold section and means to actuate the lever.

140. In a type casting machine, the combination of a bracket having elongated slots therein, a back mold section having stops contained in the slots to limit its movement, a core for the back mold section, a front mold section having a curved recess to receive the core and form the mold cavity, a slide way for the front mold section, a lever to actuate the front mold section, a trimming knife and means for moving the trimming knife across the front mold section when in its separated condition.

141. In a type casting machine, the combination of a bracket having elongated slots therein, a back mold section having stops contained in the slots to limit its movement, a core for the back mold section, a front mold section having a curved recess to receive the core and form the mold cavity, a slide way for the front mold section, a lever to actuate the front mold section, a trimming knife, an ejector and means for moving the trimming knife and ejector across the front mold section when in its separated condition.

142. In a type casting machine the combination of a bracket having elongated slots therein, a back mold section having stops contained in the slots to limit its movement, a core for the back mold section, a front mold section having a curved recess to receive the core and form the mold cavity, a slide way for the front mold section, a lever to actuate the front mold section, a line carriage, a knife bar for the line carriage, a trimming knife carried by the knife bar, a lead strip ejector connected to the knife bar and means for actuating the knife bar and line carriage.

143. In a type casting machine, the combination of the line carriage, a line carrying plate connected to the line carriage, a galley and means for delivering the line from the line carrying plate to the galley.

144. In a type casting machine, the combination of the line carriage, a line carrying plate, moving therewith, a galley, means for delivering the line from the line carrying plate to the galley and means for impressing the line into the galley.

145. In a type casting machine, the combination of the line carriage, a line carrying plate connected thereto, a galley, a line ejector lever for delivering the line from the line carrying plate to the galley and means for actuating the ejector lever.

146. In a type casting machine, the combination of the line carriage, a line carrying plate moving therewith, a galley, a line ejector lever and means for impressing the line into the galley.

147. In a type casting machine the combination of a mechanism to produce and assemble the type in individual and sequential order, a line carriage, a lead strip producing mechanism, an impressing mechanism, a galley, and means for delivering the line of type from the line carriage to the galley.

148. In a type casting machine the combination of a mechanism to produce and assemble the type in individual and sequential order, a line carriage, a lead strip producing mechanism, an impressing mechanism, a galley, means for delivering the line of type from the line carriage to the galley, and means for impressing the line into the galley.

149. In a type casting machine the combination of the line carriage, a galley, means for delivering the line from the line carriage to the galley and means for trimming the line as it is delivered into the galley.

150. In a type casting machine, the combination of the line carriage, a galley, means for delivering the line from the line carriage to the galley and means for impressing the line into the galley and means for trimming the line as it is pressed therein.

151. In a type casting machine, the combination of the line carriage, a line carrying plate moving therewith, a galley means for delivering the line from the line carrying plate to the galley and means for trimming the line as it enters therein.

152. In a type casting machine, the combination of the line carriage, the line carrying plate moving therewith, a galley, means for delivering the line from the line carrying plate to the galley, means for impressing the line into the galley and means for trimming the line as it is impressed therein.

153. In a type casting machine the combination of the type producing, assembling, and justifying mechanisms, the line carriage, the lead strip producing mechanism, an impressing mechanism, a galley, means for delivering the line of type from the line carriage to the galley, means for impressing the line into the galley and an adjustable bottom for the galley depressed as the lines of type are delivered to the galley.

154. In a type casting machine the combination of the type producing, assembling and justifying mechanisms, the line carriage, the lead strip producing mechanism, an impressing mechanism, a galley, means for delivering the line of type from the line carriage to the galley, means for impressing the line into the galley, an adjustable bottom for the galley depressed as the lines of type are delivered to the galley, and means for depressing the lines of type when in the galley.

155. In a galley for a type casting machine, the combination of the galley sides, longitudinal guides in the inner faces of the galley sides, an adjustable bottom moving therein and trimming knives for the galley.

156. In a type casting machine, the combination of a galley, a plunger opposed to the receiving end of the galley and means for actuating the plunger to impress the lines therein and trimmer knives to trim the line as it is being impressed into the galley.

157. In a type casting machine the combination of the galley, an adjustable bottom for the galley, a plunger for the galley, a yoke, rods connecting the plunger with the yoke, and means for actuating the yoke and plunger and trimmer knives to trim the line as it is being impressed into the galley.

158. In a type casting machine, the combination of the galley having a stationary back, means for removably connecting the galley to the machine, longitudinal guides in the inner faces of the galley sides, means for holding the bottom in its adjustable position, trimming knives for the galley and means for impressing the knives into the galley.

159. In a type casting machine, the combination of a galley having a rigid back, means for adjustably connecting it to the type casting machine, longitudinal guides in the inner faces of the galley sides, a galley bottom contained between the galley sides, a chamber in the galley bottom, spring tensioned pawls contained in the chamber entering the longitudinal guides and a plunger to impress the line into the galley and trimmer knives to trim the line as it is being impressed into the galley.

160. In a type casting machine the combination of the galley having a rigid back, means for removably locking it to the type casting machine, longitudinal guides in the inner faces of the galley sides, a laterally disposed chamber in the galley bottom, spring tensioned pawls in the chamber to enter the guides and adjustably hold the bottom therein, trimming knives for the galley, a plunger, a yoke, connecting rods uniting the plunger and yoke, and means for actuating the yoke and plunger.

161. In a type casting machine, the combination of a galley having a rigid back, means for removably locking it to the type casting machine, longitudinal guides in the inner faces of the galley sides, a laterally disposed chamber contained in the galley bottom, spring tensioned pawls in the chamber to enter the guides and adjustably hold the bottom therein, trimming knives for the galley, a plunger, a yoke, connecting rods uniting the plunger and yoke, a rock shaft, a link fulcrumed to the type casting machine and connected to the rock shaft and yoke, and means for actuating the rock shaft.

162. In a line casting machine, the combination of an oscillatory type metal pot, a reservoir type metal pot, a means for forcing the metal from the reservoir type metal pot to the oscillatory type metal pot, and a means for imparting the oscillating motion to the oscillatory type pot.

163. In a type casting machine the combination of the matrix bars, a mold, a type metal pot for producing the type in individual and sequential order, a reservoir supplying the type metal pot, and an overflow from the type metal pot to the reservoir.

164. In a line casting machine the combination of the matrix bars, a mold, a type metal pot for producing the type in individual and sequential order, a reservoir supplying the type metal pot, an overflow from the type metal pot to the reservoir and means for pumping the type metal from the reservoir to the type metal pot.

165. In a type casting machine the combination of the lead strip producing mechanism, the low speed starting shaft, the low speed driving shaft and means for actuating the low speed starting shaft to set in motion the low speed driving shaft.

166. In a type casting machine, the combination of the lead strip producing mechanism, a spring tensioned swinging lever, fitted with a cam, a low speed starting shaft and a crank for the low speed starting shaft having a pin riding on the cam of the swinging lever.

167. In a type casting machine, the combination of the lead strip producing mechanism, the low speed starting shaft, a controlling link actuated thereby, a rock shaft, a low speed starting and stopping lever fulcrumed on the rock shaft and connected to the controlling link.

168. In a type casting machine, the combination of the lead strip producing mechanism, the low speed starting shaft, a controlling link actuated thereby, a rock shaft, a low speed starting and stopping lever fulcrumed on the rock shaft and connected to the controlling link, a high speed shaft, a clutch member rigidly mounted on the high speed shaft, and a clutch member loosely mounted on the high speed shaft actuated by the rock shaft.

169. In a type casting machine, the combination of the lead strip producing mechanism, the low speed starting shaft, a controlling link actuated thereby, a rock shaft, a low speed starting and stopping lever fulcrumed on the rock shaft and connected to the controlling link, a high speed shaft, a clutch member rigidly mounted on the high speed shaft, a clutch member loosely mounted on the high speed shaft actuated by the rock shaft, a low speed shaft and means for transmitting motion from the high speed shaft to the low speed shaft.

170. In a type casting machine, the combination of lead strip producing mechanism, the low speed starting shaft, a controlling link actuated thereby, a rock shaft, a low speed starting lever fulcrumed on the rock shaft and connected to the controlling link, an emergency cam for the controlling link and an emergency lever to actuate the rock shaft.

171. In a type casting machine the combination of a type mold, an oscillatory type metal pot movable to and away from the type mold, and means in the type mold for forming a dove tailed core in the type.

172. In a type casting machine the combination of the matrix bars, a mold having a series of channels alining with said matrix bars, an oscillatory type metal pot having a series of wells corresponding to said mold channels, plungers for said wells and plunger tripping means positioned by the matrix bar to actuate the corresponding plunger.

173. In a type casting machine the combination of a type mold, an oscillatory type metal pot movable to and away from the type mold, means to force the type metal from the type metal pot into the mold when in contact therewith and means in the type mold for forming a dove tailed core in the type.

174. A type casting machine comprising a mold having a plurality of cells adapted for casting individual type, matrices to be selectively presented to the mold cells, a type metal pot having a separate communication for each mold cell, an individual pump for each separate communication arranged for operation in the type metal pot, and means for actuating the pumps controlled by the presentation of the matrices to the mold cells.

175. A type casting machine comprising a mold having a plurality of mold cells adapted for casting individual type, matrices to be selectively presented to the mold cells, a rocking metal pot having a separate communication for each mold cell, an individual pump for each separate communication arranged for operation in the metal pot, and means for actuating the pumps controlled by the presentation of the matrices to the mold cells.

176. A type casting machine comprising a mold having a plurality of mold cells adapted for casting individual type, matrix bars having character matrices, mechanism for selectively presenting the matrices to the mold cells, a rocking metal pot having a separate communication for each mold cell, an individual pump for each separate communication arranged for operation in the metal pot, means for normally locking said pumps from operation and means controlled by the presentation of the matrices to the mold cells for actuating the pumps.

177. A type casting machine comprising a mold having a plurality of mold cells adapted for casting individual type, matrix bars having character matrices, mechanism for selectively presenting the matrices to the mold cells, a rocking metal pot having a separate communication for each mold cell, an individual pump for each separate communication arranged for operation in the metal pot, means for normally locking said pumps from operation, means controlled by the presentation of the matrices to the mold cells for actuating the pumps, and means for ejecting the type from the mold cells.

178. A type casting machine comprising a mold having a plurality of mold cells adapted for casting individual type, matrices to be selectively presented to the mold cells, a metal pot having a separate communication for each mold cell, an individual pump for each separate communication arranged for operation in the metal pot, locking means for holding the pumps inactive, and means controlled by the presentation of the matrices to the mold cells for releasing the locking means.

179. A type casting machine comprising a mold having a plurality of mold cells adapted for casting individual type, matrices to be selectively presented to the mold cells, a metal pot having a separate communication for each mold cell, an individual pump for each separate communication arranged for operation in the metal pot, spring tensioned means for actuating the pumps, and locking means for holding the pumps inactive released by the presentation of the matrices to the mold cells.

180. A type casting machine comprising a mold having a plurality of mold cells adapted for casting individual type, matrices to be selectively presented to the mold cells, a metal pot having a separate communication for each mold cell, an individual pump for each separate communication arranged for operation in the metal pot, a spring tensioned means for actuating the pumps, locking means for holding the pumps inactive released by the presentation of the matrices to the mold cells and means for ejecting the type from the mold cells after the casting operation.

181. A type casting machine comprising a mold having a plurality of mold cells adapted for casting individual type, matrices to be selectively presented to the mold cells, a rocking metal pot having a separate communication for each mold cell means for rocking the metal pot to bring the communications into contact with the mold cells, an individual pump for each separate communication arranged for operation in the metal pot, and means for actuating the pumps controlled by the presentation of the matrices to the mold cells.

182. A type casting machine comprising a mold having a plurality of mold cells for casting individual type, matrices to be selectively presented to the mold cells, a rocking metal pot having a separate communication for each mold cell, means for rocking the metal pot to bring the communications into contact with the mold cells, an individual pump for each separate communication arranged for operation in the metal pot, means for actuating the pumps, locking means for holding the pumps normally inactive released by the presentation of the matrices to the mold cells.

183. A type casting machine comprising a mold having a plurality of mold cells adapted for casting individual type, matrices to be selectively presented to the mold cells, a metal pot having a separate communication for each mold cell, an individual pump for each separate communication arranged for operation in the metal pot, means to automatically actuate a pump on the presentation of a selected matrix to its corresponding mold cell, means to normally hold the pumps inactive, and means carried by the matrices to release the last mentioned means.

Toronto, May 3rd, A. D. 1902.

A. W. HANIGAN.

Signed in the presence of—
  L. F. Brock,
  C. H. Nulin.